United States Patent
Imaki

(10) Patent No.: US 8,904,225 B2
(45) Date of Patent: Dec. 2, 2014

(54) STREAM DATA PROCESSING FAILURE RECOVERY METHOD AND DEVICE

(75) Inventor: Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 13/389,971

(22) PCT Filed: Aug. 24, 2010

(86) PCT No.: PCT/JP2010/064284
§ 371 (c)(1),
(2), (4) Date: Feb. 10, 2012

(87) PCT Pub. No.: WO2011/114548
PCT Pub. Date: Sep. 22, 2011

(65) Prior Publication Data
US 2012/0331333 A1 Dec. 27, 2012

(30) Foreign Application Priority Data
Mar. 15, 2010 (JP) .................... 2010-057404

(51) Int. Cl.
G06F 11/00 (2006.01)
G06F 11/16 (2006.01)
G06F 11/20 (2006.01)

(52) U.S. Cl.
CPC ........ G06F 11/1658 (2013.01); G06F 11/2038 (2013.01)
USPC ........................................................ 714/4.21

(58) Field of Classification Search
CPC ............ G06F 11/1469; G06F 11/1471; G06F 11/0793; G06F 11/1658; G06F 11/2038; H04L 29/14
USPC .................................................. 714/2, 4.21
See application file for complete search history.

(56) References Cited

U.S. PATENT DOCUMENTS

| 2006/0277230 | A1 | 12/2006 | Nishizawa et al. |
| 2008/0256146 | A1 | 10/2008 | Nishizawa et al. |
| 2009/0172142 | A1 | 7/2009 | Hanai et al. |
| 2009/0249222 | A1* | 10/2009 | Schmidt et al. ............... 715/751 |
| 2010/0106946 | A1 | 4/2010 | Imaki et al. |

FOREIGN PATENT DOCUMENTS

| JP | 2006-338432 A | 12/2006 |
| JP | 2009-157785 A | 7/2009 |
| JP | 2010-108152 A | 5/2010 |

OTHER PUBLICATIONS

International Search Report with English translation dated Sep. 28, 2010 (three (3) sheets).
Babcock et al., "Models and Issues in Data Stream Systems", In Proc. of PODS 2002, 2002, pp. 1-16 (sixteen (16) sheets).

(Continued)

*Primary Examiner* — Yair Leibovich
(74) *Attorney, Agent, or Firm* — Crowell & Moring LLP

(57) ABSTRACT

In a duplex configuration of stream data processing, all window operations can be used without stopping the process when adding a standby system. The time when the standby system server is added is stored as the reproduction time, and data copied from the data generated at or after the reproduction time is transmitted to the standby system. While the data processing in the in-use system is continued, changes in the execution state which occur in operators holding execution state at or after the reproduction time are recorded. The execution states are copied to the standby system for each operator in parallel with the data processing. At this time, the execution states of the operators at the reproduction time are reproduced from the execution states of the operators when the copy is performed and the record of the changes of the execution states, and the reproduced execution states are copied. When the execution states of all the operators have been copied, the standby system starts processing of the copied data which are generated at or after the reproduction time.

15 Claims, 25 Drawing Sheets

(56) References Cited

OTHER PUBLICATIONS

Hwang et al., "High-Availability Algorithms for Distributed Stream Processing", Proceedings of the 21$^{st}$ International Conference on Data Engineering (ICDE 2005), 2005 (twelve (12) sheets).

Arasu et al., "The CQL Continuous Query Language: Semantic Foundations and Query Execution", Stanford University, pp. 1-32 (thirty-two (32) sheets).

* cited by examiner

FIG. 3

```
REGISTER STREAM sa(id VARCHAR(30), val INT);
REGISTER STREAM sb(id VARCHAR(30), val INT);

REGISTER QUERY q1
  ISTREAM(
    SELECT sa.id, sa.val AS va, sb.val AS vb
      FROM sa[PARTITION BY id ROWS 2], sb[RANGE 5 MINUTES]
      WHERE sa.id = sb.id AND sa.val > 100 AND sb.val <> -1
  );
REGISTER QUERY q2
    SELECT id, AVG(va) AS va, AVG(vb) AS vb
      FROM q1 [UNBOUNDED]
      GROUP BY id;
REGISTER QUERY q3
  ISTREAM(
    SELECT id, va/vb AS val
      FROM q2
  );
REGISTER QUERY q4
ISTREAM(SELECT * FROM q2);
```

FIG. 4

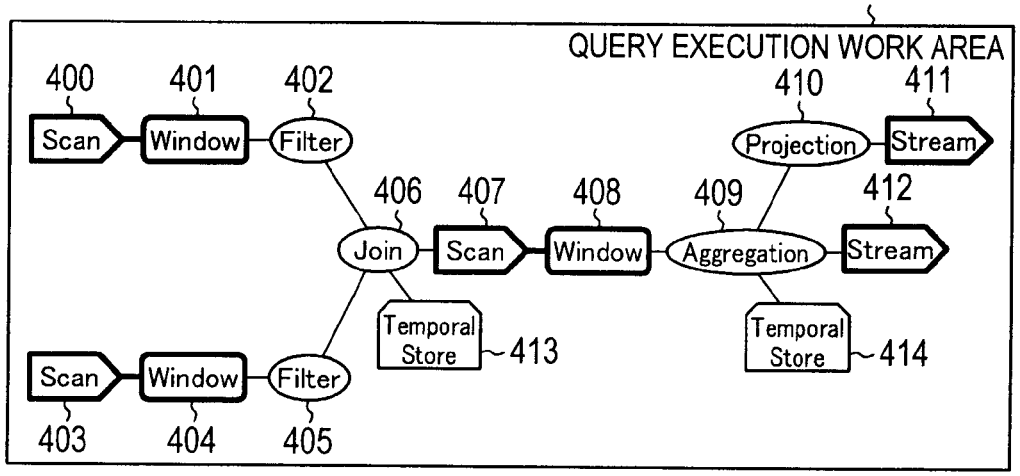

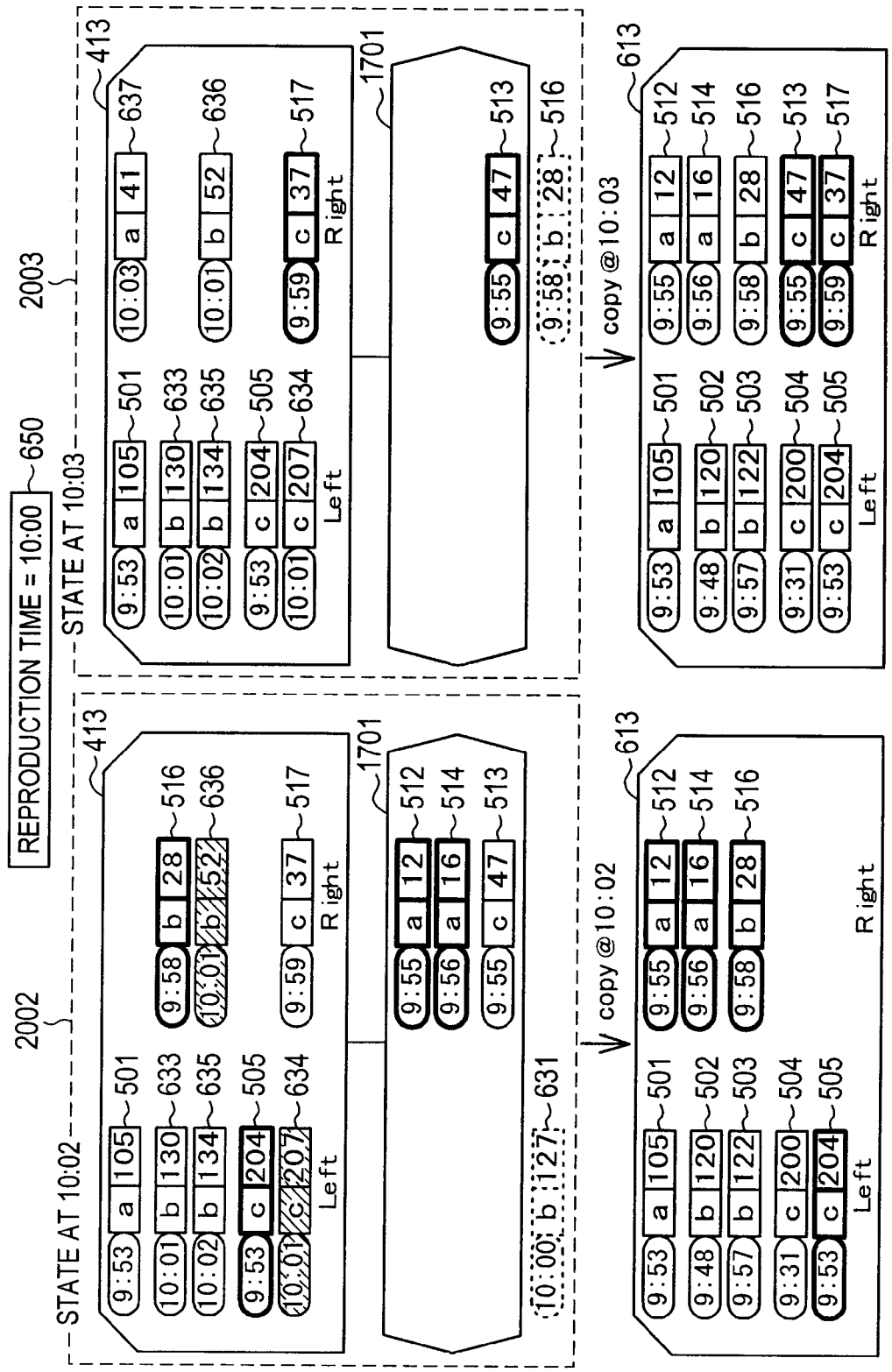

STREAM DATA PROCESSING FAILURE RECOVERY METHOD AND DEVICE

TECHNICAL FIELD

The present invention relates to a failure recovery technique in stream data processing, in particular to a standby system addition technique for returning from a single system operation to a duplex system operation after a failure occurs in a duplex configuration.

BACKGROUND ART

Stream data processing which realizes real time processing of high-rate data attracts attention in an environment marked by an advance in technology for analyzing, in real-time, information continuously generated at high rate, such as automatic stock exchange, high-level traffic information processing, and analysis of click stream, and acting quickly. The stream data processing is a general-purpose middleware technique that can be applied to various data processing, so that the stream data processing makes it possible to use data in the real world for business in real-time while responding to a rapid change in a business environment in which there is no time to establish a system for each project. The principle and implementation method of the stream data processing is disclosed in Non-Patent Literature 1.

As described above, the stream data processing is real-time processing of high-rate data, so that output data of the processing result is continuously generated at high rate. Therefore, it is required that the period of time taken from when a failure occurs to when the result can be outputted again is shorter than one second. An effective method for realizing such a recovery time is a use of a duplex configuration in which two servers that perform the same processing are prepared and when a failure occurs in a server that outputs results to an application, the other server takes over the role of outputting the results.

When a failure occurs in a duplex configuration, a single system operation occurs in which only a single server operates, so that if a further failure occurs, the system halts. To avoid the system halt, it is necessary to add a standby system server to an in-use system server operating alone and restore the duplex configuration. At this time, the execution state of the added standby server is an initial state, so that the execution state of the in-use system server needs to be reproduced in the standby system server.

As a first method for reproducing the execution state in the standby system server, Non-Patent Literature 2 discloses an Upstream Backup method in which input streams are backed up during a normal operation and when the standby system is added, the standby system server executes the backup data to catch up with the execution state of the in-use system server. The longer the processing time is, the larger the storage capacity of a disk or a memory necessary for the backup is. However, it can be assumed that the capacity is within a certain range because of the reason described below.

In the stream data processing, it is possible to use a window operation that extracts a most recent portion from a data series. The definition of the window operation is disclosed in Non-Patent Literature 3. For example, when applying an aggregation operation that calculates an average of the data extracted by the window operation with a time width of one minute, an operation of calculating a moving average of one minute occurs. In this example, if continuously flowing data for one minute, data in the window is renewed, so that if the standby system server which starts from the initial state processes data of most recent one minute, the standby system server has the same execution state as that of the in-use system server.

As a second method for reproducing the execution state in the standby system server, there is a method in which, when the standby system is added, the in-use system is temporarily stopped to cause the execution state to be static, and the execution state is transmitted to the standby system server as a snapshot. The method for setting the execution state to be static and transmitting a snapshot is widely used for a database and a transaction system. Patent Literature 1 discloses a standby system addition method which uses the static execution state in an in-memory database.

CITATION LIST

Patent Literature

Patent Literature 1: Japanese Patent Application Laid-Open Publication No. 2009-157785

Non-Patent Literature

Non-Patent Literature 1: B. Babcock, S. Babu, M. Datar, R. Motwani and J. Widom, "Models and issues in data stream systems", In Proc. of PODS 2002, pp. 1-16. (2002)

Non-Patent Literature 2: J. H. Hwang, M. Balazinska, A. Rasin, U. Cetinternel, M. Stonebraker, and S. B. Zdonik, "High-Availability Algorithms for Distributed Stream Processing", In Proc. of ICDE 2005, pp. 779-790. (2005)

Non-Patent Literature 3: A. Arasu, S. Babu, and J. Widom, "The CQL Continuous Query Language: Semantic Foundations and Query Execution", (2005)

SUMMARY OF INVENTION

Technical Problem

As described above, in the Upstream Backup method, it is assumed that a range of data that should be held advances toward the future along with the progress of the processing, so that it can be assumed that the capacity for the backup is within a certain range.

However, as the window operation, in addition to a Range window, there are a Rows window, a Partition window, an Unbounded window, and the like. Different from the Range window, in these windows, the window may not be renewed even when flowing data for a certain period of time. For example, a process for calculating the trading volume statistics of most recent 100 stocks for each stock in an analysis of the stock exchange can be easily defined by using the Partition window. In this case, if there is a stock whose trading is not active, the trading data of the stock continuously remains in the window. A process for calculating statistics of all trading from the start of the analysis can be easily defined by using the Unbounded window. However, all data remains in the Unbounded window after the start of the analysis, so that the Unbounded window is never renewed.

If the Upstream Backup method is applied to such a case, the starting point of the range of data that should be held does not advance, so that the storage capacity necessary to hold the data increases infinitely and data overflow occurs eventually.

On the other hand, in the method that uses snapshot, it is possible to use not only the Range window operation, but also all window operations. However, while the in-use server is set to be static, output of results is halted, so that the application is affected by the halt of processing. The larger the data size of the execution state, the longer the halt time.

To address the above problem, Patent Literature 1 discloses a method in which triplex or more configuration is used instead of the duplex configuration and when a failure occurs in one server and the system becomes duplex or more configuration, one of the in-use system servers is set to be static and a snapshot is transferred to a standby system server to be added. At this time, the other in-use system server is not set to be static, so that it is possible to avoid the halt of processing described above. However, there servers are required, so that an introduction cost and an operation cost increase.

An object of the present invention is to provide a stream data processing failure recovery method and device in which, in a duplex configuration of stream data processing, all window operations can be used without stopping the process when adding a standby system.

Further, another object of the present invention is to provide a stream data processing failure recovery method and device which can reproduce the execution state of the in-use system server when the standby system server is added in the standby system server without using data backed up in a normal operation and without setting the in-use system server to be static.

Solution to Problem

To achieve the above object, the present invention provides a stream data processing failure recovery method in a redundant configuration using plural computer groups, in which the computer group includes a first computer that outputs a processing result of an operator aggregation on a query graph of data, the first computer defines a time based on a standby system addition notification indicating that a second computer is added to the computer group as a reproduction time, in an execution loop of the operator aggregation on the query graph, when executing a target operator whose state should be copied in the operator aggregation, if an execution state of the target operator changes from a state at the reproduction time, the first computer stores information representing the change of the state, and at a predetermined timing in the execution loop, the first computer reproduces an execution state of the target operator at the reproduction time from an execution state of the target operator at the timing and the information representing the change of the state and transmits the reproduced execution state to the second computer.

Further, to achieve the above object, the present invention provides a computer device that performs stream data processing in a redundant configuration using plural computer groups. The computer device includes an interface unit, a storage unit, and a processing unit that outputs a processing result of an operator aggregation on a query graph of data. When the processing unit reproduces an execution state of the operator aggregation in another computer newly added to the computer group, the processing unit determines a reproduction time based on a standby system addition notification indicating that the other computer is added. In an execution loop of the operator aggregation on the query graph, when executing a target operator whose state should be copied in the operator aggregation, if an execution state of the target operator changes from a state at the reproduction time, the processing unit stores information representing the change of the state in the storage unit. At a predetermined timing in the execution loop, the processing unit reproduces an execution state of the target operator at the reproduction time from an execution state of the target operator at the timing and the stored information representing the change of the state and transmits the reproduced execution state to the other computer via the interface unit.

Further, to achieve the above object, the present invention provides a second computer device that performs stream data processing in a redundant configuration using plural computer groups. The second computer device includes an interface unit, a storage unit, and a processing unit. The processing unit transmits a standby system addition notification indicating that the computer device is added to the computer group to another computer including an in-use system of the computer group via the interface unit. The processing unit receives execution states of all window operations which are target operators whose state should be copied via the interface unit. Here, the execution states are states at a reproduction time determined by the other computer when the other computer receives the standby system addition notification. The processing unit performs processing of operators on a partial query graph which starts from the window operation and ends at a nearest streaming operation located on a post-stage of the window operation on data of the window operation having been received.

In summary, to achieve the above object, in the preferred embodiments of the present invention, the standby system is added in the procedure described below. (1) A data processing execution time in the in-use system server when the standby system server is added is stored as the reproduction time. (2) Data at or after the reproduction time is copied and the data is started to be transmitted to the standby system server. (3) The data processing in the in-use system is continued, and changes in an execution state which occur in operators holding execution state at or after the reproduction time are recorded for each operator. (4) In the in-use system, while the data processing is performed, the execution state is copied to the standby system server for each operator holding execution state. At this time, the execution state of the operator at the reproduction time is reproduced from the execution state of the operator when the copy is performed and the recorded changes of the execution state at or after the reproduction time, and the reproduced execution state is copied. When the copy is completed, the recording of the changes in the execution state of the operators described in (3) is stopped. (5) When the copy is completed for all the operators holding execution state, the standby system server starts processing of the copied data at or after the reproduction time.

Here, the recorded changes in an execution state described in (3) are an aggregation of data which disappear from the execution state of the operator and which have a time stamp before the reproduction time. Here, the reproduction of the execution state described in (4) is a data aggregation which is a union of an aggregation of data which have a time stamp before the reproduction time in the execution state when the copy is performed and a data aggregation which is the recorded changes in the execution state at or after the reproduction time.

Advantageous Effects of Invention

By the present invention, in a duplex configuration of stream data processing, not only the Range windows, but also all the window operations can be used without stopping the process to be static when adding a standby system. Further, it is possible to reproduce the execution state of the in-use system server when the standby system server is added in the standby system server without using data backed up in a normal operation and without setting the in-use system server to be static.

BRIEF DESCRIPTION OF DRAWINGS

FIG. 3 is a diagram showing a data processing definition according to the first embodiment.

FIG. 4 is a diagram showing a result of converting the data processing definition shown in FIG. 3 into a query graph.

FIG. 20B is a diagram illustrating a method for subdividing and reproducing an execution state of the join operator of the in-use system in the standby system as a modified example of the first embodiment.

DESCRIPTION OF EMBODIMENTS

Figure 1:
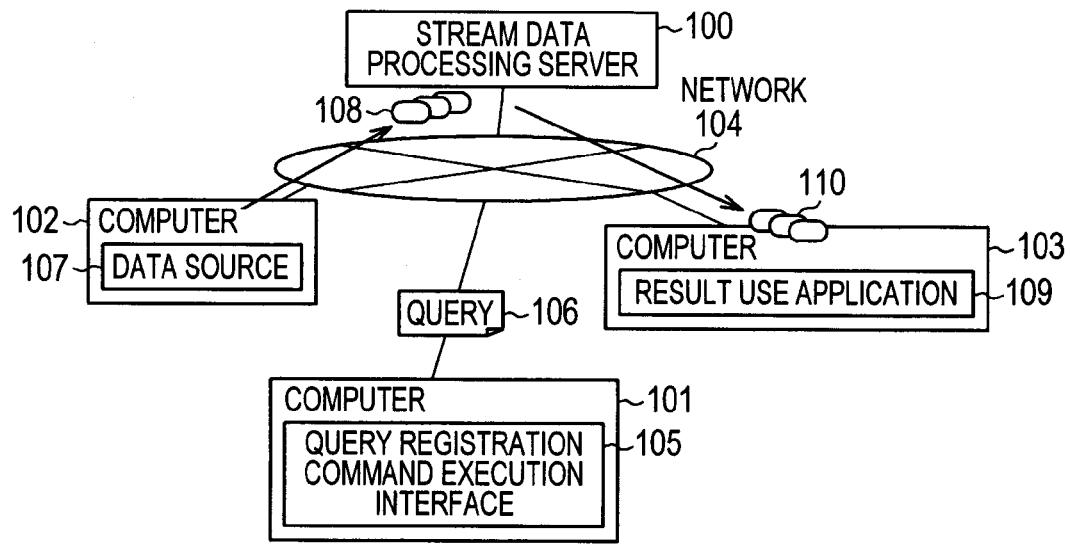
FIG. 1 is a diagram showing an example of a configuration of a computer environment in which a stream data processing server according to a first embodiment is used.

Hereinafter, embodiments of the present invention will be described in detail with reference to the drawings. The same members are denoted by the same reference numerals throughout all the drawings for describing the embodiments in principal, and repetitive descriptions thereof will be omitted.

First Embodiment

First, a basic configuration of a stream data processing system for realizing a first embodiment will be described with reference to FIGS. 1 and 2.

Figure 2:
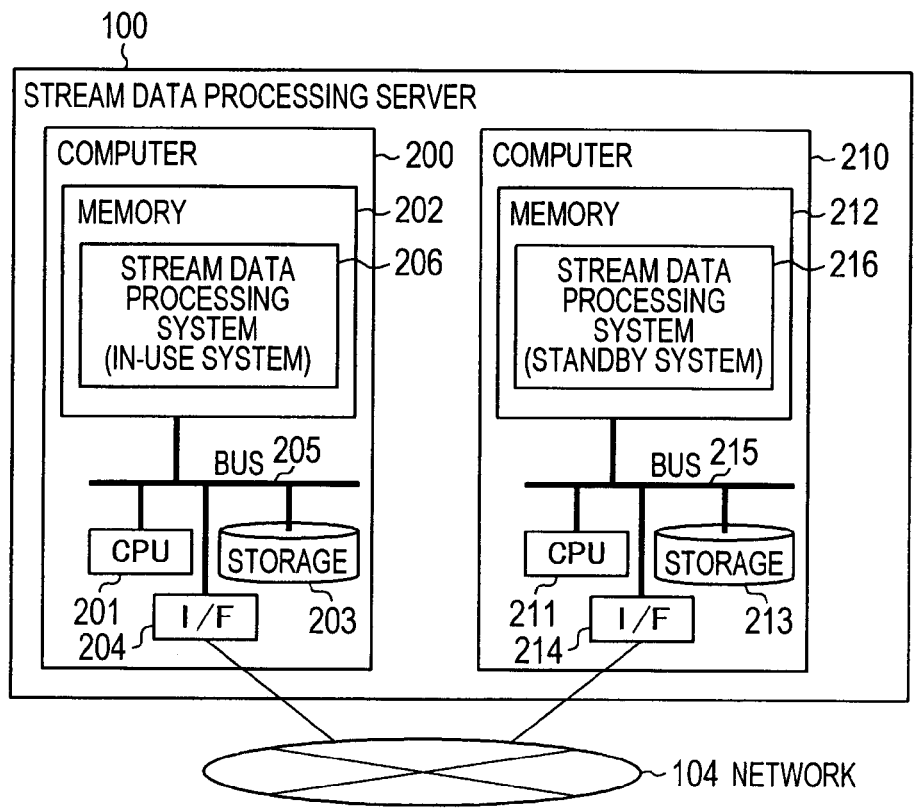
FIG. 2 is a diagram showing an example of a configuration of a duplicated stream data processing server according to the first embodiment.

As shown in FIG. 1, a stream data processing server 100 and computers 101, 102, and 103 are connected to a network 104. As shown in FIG. 2, the stream data processing server 100 of the present embodiment includes two computers 200 and 210. The computers 200 and 210 respectively include memories 202 and 212 that are storage units, central processing units (CPU) 201 and 211 that are processing units, network interface units (I/F) 204 and 214, storages 203 and 213 that are storage units, and buses 205 and 215 that connect the above components.

An in-use stream data processing system 206, which defines a logical operation of stream data processing of the in-use system, is disposed on the memory 202. The in-use stream data processing system 206 is an execution image that can be interpreted and executed by the CPU 201 as described later in detail. A standby stream data processing system 216, which defines a logical operation of stream data processing of the standby system, is disposed on the memory 212. The standby stream data processing system 216 is an execution image that can be interpreted and executed by the CPU 211 as described later in detail.

The computers 200 and 210 included in the stream data processing server 100 are connected to the external network 104 via the network I/Fs 204 and 214.

When the computers 200 and 210 included in the stream data processing server 100 receive a query 106 defined by a user via a query registration command execution interface 105 running on the computer 101 connected to the network 104, the stream data processing systems 206 and 216 form a query graph by which stream data processing can be executed according to the definition in the stream data processing systems 206 and 216. Thereafter, when the computers 200 and 210 included in the stream data processing server 100 receive data 108 transmitted by a data source 107 running on the computer 102 connected to the network 104, the computers 200 and 210 process the data 108 according to the query graph and generate result data 110. The result data 110 is transmitted to a result use application 109 running on the computer 103 connected to the network 104. In addition to the stream data processing systems 206 and 216, the storages 203 and 213 store the received query 106. The stream data processing systems 206 and 216 can load the defined query from the storages 203 and 213 at the time of startup and form the query graph.

The configuration described above is an example of the present embodiment, so the computers 200 and 210 may be included in one computer and the CPUs 201 and 211 may be two processors on the same computer. Or, the CPUs 201 and 211 may be two computing cores in one multi-core CPU. The memories 202 and 212, the network I/Fs 204 and 214, and the storages 203 and 213 may be integrated into one memory, one network I/F, and one storage respectively and connected to one computer or connected to two computers and shared by the two computers.

Next, an example of the query and the query graph in the steam data processing of the present embodiment will be described with reference to FIGS. 3 and 4.

A query 300 illustrated in FIG. 3 is a query that defines two input streams sa and sb and four queries q1, q2, q3, and q4. As shown in FIG. 4, when the stream data processing system receives the definition of the query 300, the stream data processing system generates a query graph including operators 400 to 412 on a query execution work area 420 secured in an execution area of the stream data processing system. The query operator 400 is a Scan operator that receives an input stream sa from the data source, and the operator 403 is a Scan operator that receives an input stream sb from the data source. The streams sa and sb are data series including a character string type column id and an integer type column val. The query graph shown in FIG. 4 includes four partial query graphs corresponding to the queries q1, q2, q3, and q4 as described sequentially below.

The operators 401, 402, 404, 405, 406, and 407 are an operator group included in a partial query graph corresponding to the query q1. The operator 401 is a Partition window (PARTITION BY id ROWS 2) performed on the stream sa. The operator 401 extracts two latest data for each column id. The operator 404 is a Range window (RANGE 5 MINUTES) performed on the stream sb. The operator 404 extracts data of the latest 5 minutes. The operator 402 is a filter operator (sa.val>100) performed on data extracted by the window 401. The operator 402 lets data whose value of column val is greater than 100 pass through. The operator 405 is a filter operator (sb.val< >−1) performed on data extracted by the window 404. The operator 405 lets data whose value of col-umn val is other than −1 pass through. The operator 406 is a join operator (sa.id=sb.id). The operator 406 generates a combination of data which pass through the operator 402 or the operator 405 and have the same column id. The operator 407 is a streaming operation that normalizes the result of the query.

The operators 408 and 409 are an operator group included in a partial query graph corresponding to the query q2. The operator 408 is an Unbounded window (UNBOUNDED). The operator 408 holds all the result data of the query q1. The operator 409 is an aggregation operator. The operator 409 calculates an average of sa.val and sb.val for each column id.

The operators 410 and 411 are an operator group included in a partial query graph corresponding to the query q3. The operator 410 is a projection operator. The operator 410 processes the result of the query q2. The operator 411 is a streaming operation that normalizes the result of the query. The operator 412 is an operator included in a partial query graph corresponding to the query q4. The operator 412 is a streaming operation that normalizes the result of the query.

Temporary holding areas 413 and 414 are areas for holding the execution states of the join operator 406 and the aggregation operator 409 respectively. The temporary holding area 413 holds live data of left input and right input of the operator 406. These data join with data coming in an opposite input. The temporary holding area 414 holds one data of the aggregation result for each group.

In addition to the join operator and the aggregation operator that include the temporary holding areas described above, a window operation is also an operator which holds an execution state. The window operation defines a lifetime for each input data and holds live data. It is not necessary to hold execution state of the filter operator, the projection operator, the streaming operation, and the Scan operator.

Figure 5A:
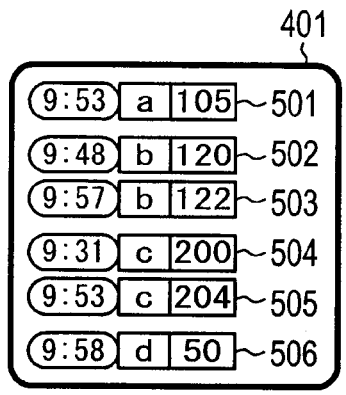
FIG. 5A is a diagram showing an example of an execution state of a window operation in the query graph shown in FIG. 4.
Figure 5B:
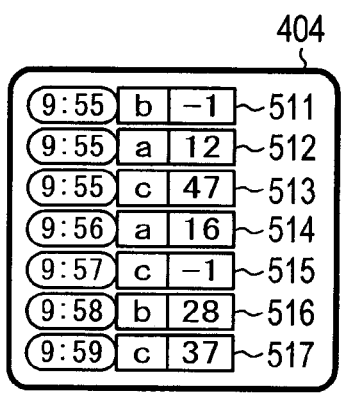
FIG. 5B is a diagram showing another example of an execution state of a window operation in the query graph shown in FIG. 4.

Next, an example of an execution state of each operator in the query graph in FIG. 4 will be described with reference to FIGS. 5A to 5E. FIG. 5A shows a state in which the window operation 401 holds data 501 to data 506. FIG. 5B shows a state in which the window operation 404 holds data 511 to data 517. An area of data surrounded by an ellipse represents a time stamp of the data. The left rectangle represents the value of the column id and the right rectangle represents the value of the column val. The Partition window 401 holds up to two data for each column id. The Range window 404 holds data whose time stamp is in a range between 9:55 and 9:59.

Figure 5C:
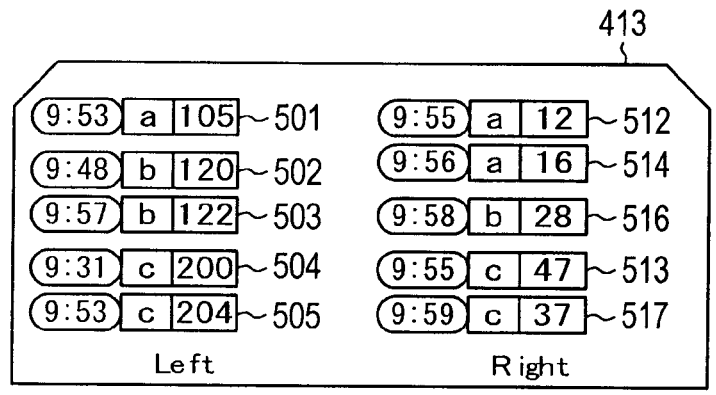
FIG. 5C is a diagram showing an example of an execution state in a temporary protected area in the query graph shown in FIG. 4.

The temporary holding area 413 in FIG. 5C holds live data 501 to 505 of left input from the operator 402 and live data 512, 513, 514, 516, and 517 of right input from the operator 405. The live data 501 to 505 are an aggregation of data that satisfies a filter condition sa.val>100 among data aggregations held by the window operation 401. The live data 512, 513, 514, 516, and 517 are an aggregation of data that satisfies a filter condition sb.val< >−1 among data aggregations held by the window operation 404. As described above, the join condition is that the equal sign is established for the column id, so that the data are indexed using the values of column id as a key and the data are sorted into groups according to the values of column id and held.

Figure 5D:
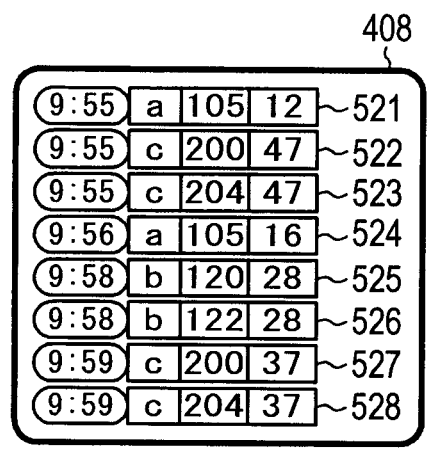
FIG. 5D is a diagram showing another example of an execution state of a window operation in the query graph shown in FIG. 4.

The window operation 408 in FIG. 5D holds combinations 521 to 528 that satisfies the join condition sa.id=sb.id in the direct product of the left input data aggregation and the right input data aggregation held in the temporary holding area 413. The later time stamp between the time stamps of the combined left and right data is employed as the time stamp of the combined data.

Figure 5E:
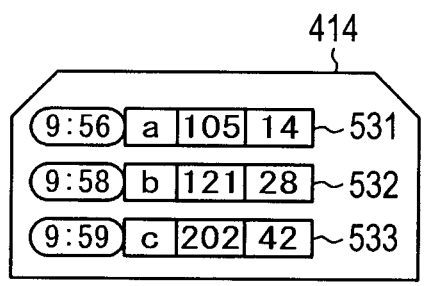
FIG. 5E is a diagram showing another example of an execution state in a temporary protected area in the query graph shown in FIG. 4.

The temporary holding area 414 shown in FIG. 5E holds data obtained by sorting and aggregating the data held by the window operation 408 into groups for each column id. The temporary holding area 414 holds one data for each group. The temporary holding area 414 holds data 531 for the column id a, data 532 for the column id b, and data 533 for the column id c.

Next, an outline of an operation of adding a standby system in the present embodiment will be described with reference to FIG. 6. It is assumed that the standby stream data processing system 216 is added during a single system operation in which only the in-use stream data processing system 206 shown in FIG. 2 is running. When the standby stream data processing system 216 is added, the in-use stream data processing system 206 is notified that the standby stream data processing system 216 is added. The in-use stream data processing system 206 stores the time determined from the time when the standby system addition notification is received, such as the system time when the notification is received (in this example, 10:00), in the storage unit as a reproduction time 650. The in-use stream data processing system 206 copies input data 631 to 637 at or after the reproduction time to data 641 to 647 and inputs the data 641 to 647 into the standby system. The in-use system continues the data processing at or after the reproduction time. On the other hand, the standby system does not process the data but holds the data in the storage 213, which is a storage unit inside the computer 210, or the like.

Figure 6:
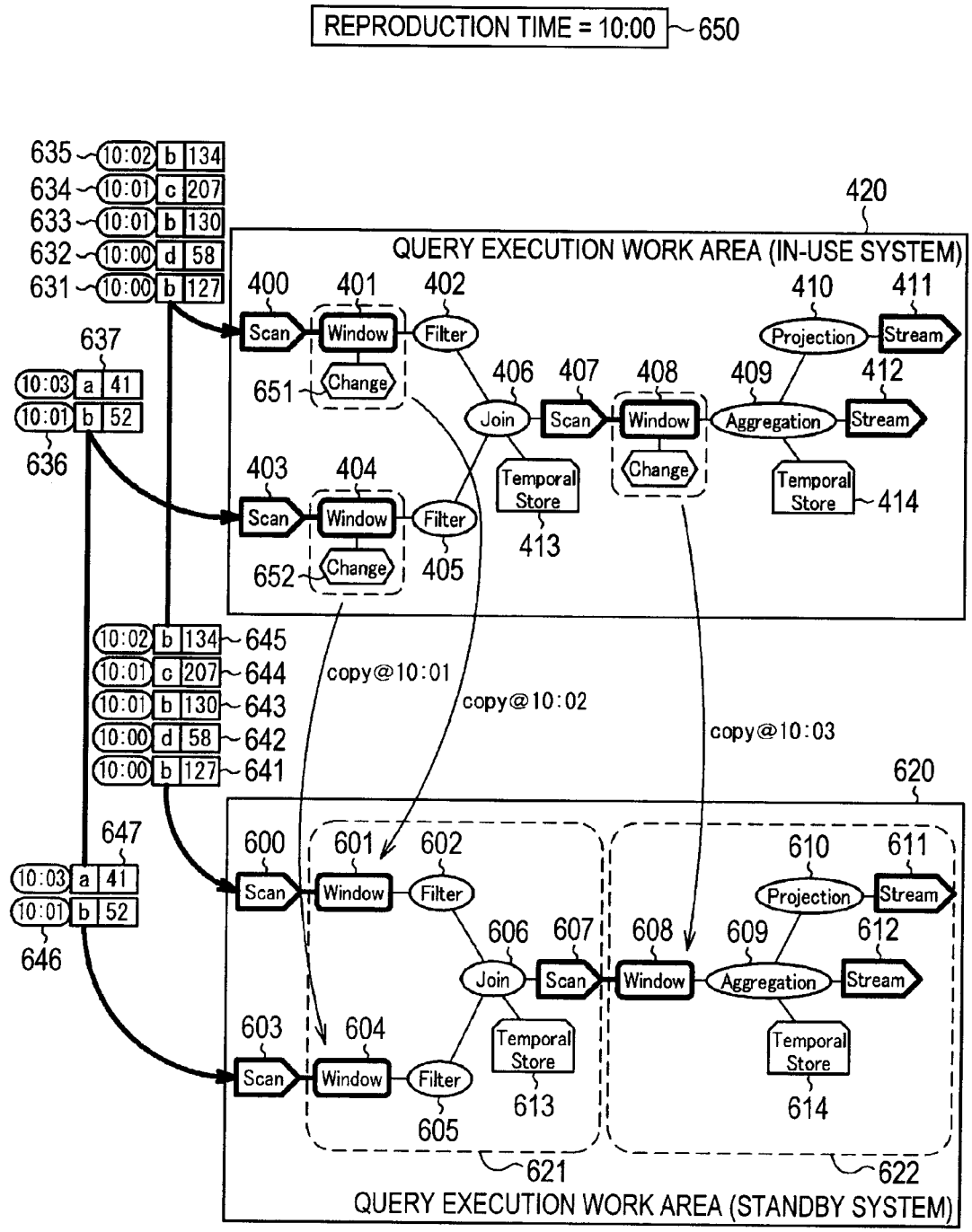
FIG. 6 is a diagram showing an outline of an operation of adding a standby system according to the first embodiment.

The standby stream data processing system 216 shown in FIG. 6 generates a query graph including operators 600 to 612 on a query execution work area 620 secured in an execution area of the standby stream data processing system 216. This query graph is the same as that on the query execution work area 420 of the in-use system. However, the window operations 601, 604, and 608 and the temporary holding areas 613 and 614, which are to hold execution state, are empty.

On the other hand, state change recording areas 651, 652, and 653 are generated corresponding to the in-use system window operations 401, 404, and 408, respectively. The changes in the execution state that occur in each window at or after the reproduction time 10:00 in the process of data processing in the in-use system are recorded in the corresponding state change recording areas 651, 652, and 653.

Next, the execution states of the window operations 401, 404, and 408 are sequentially copied to the window operations 601, 604, and 608. Here, the execution states that need to be copied are the execution states immediately before the reproduction time 10:00, that is, the execution states immediately before the input data of 10:00 is processed.

As an example, the execution states at this time point are assumed to be the execution states shown in FIGS. 5A to 5E. First, the execution state of the window operation 404 is copied to the window operation 604. If the copy time is 10:01 (referred to as copy@10:01, the same shall apply hereinafter), the data at or before 9:56, which is 5 minutes before 10:01, disappear from the window operation 404. The disappearing data is recorded in the state change recording area 652 as a change in the execution state in the window operation 404. The data before the reproduction time 10:00 among the data on the window operation 404 at the copy time 10:01 and the data in the state change recording area 652 are combined together, so that the execution state of the window operation 404 immediately before the reproduction time 10:00 is reproduced and the execution state is copied to the window operation 604.

Similarly, when the execution state of the window operation 401 is copied at 10:02, the execution state of the window operation 401 immediately before the reproduction time 10:00 is reproduced from the execution state of the window operation 401 at the copy time 10:02 and the data in the state change recording area 651 and then the execution state is copied to the window operation 601 because the changes in the window operation 401 from the reproduction time 10:00 to 10:02 are recorded in the state change recording area 651. When the execution state of the window operation 408 is copied at 10:03, the operation similar to the above is performed. The details of the method for reproducing the execution state of the window operation at the reproduction time from the execution state of the window operation at the copy time and the data in the state change recording area will be described later.

According to the system of the present embodiment illustrated in FIG. 6, after the execution states of the window operations of the in-use system immediately before 10:00 have been copied to the window operations 601, 604, and 608 of the standby system 620, a partial query graph from the window operation to the streaming operation is performed on the data on the window operations 601, 604, and 608, so that it is possible to reproduce the states of operators holding execution state other than the window operations on the query graph to the state of the in-use system immediately before the reproduction time 10:00. In the example of FIG. 6, the operator groups 621 and 622 enclosed by a dashed line square with rounded corners form a partial query graph from the window operations 601, 604, and 608 to the streaming operations 607, 611, and 612.

The partial query graph 621 from the beginning to the streaming operation 607 is performed on the data reproduced on the window operations 601 and 604, so that the execution state of the operator 606 on the graph immediately before 10:00 is reproduced in the temporary holding area 613. Further, the partial query graph 622 from the beginning to the streaming operations 611 and 612 is performed on the data reproduced on the window operations 608, so that the execution state of the operator 609 on the graph immediately before 10:00 is reproduced in the temporary holding area 614.

After reproducing the execution state of the query execution work area 420 of the in-use system immediately before 10:00 in the query execution work area 620 of the standby system, the processing of the data 641 to 647 at or after the reproduction time, which are copied and held, is started. Thereby, the return to the duplex configuration is completed.

Figure 7:
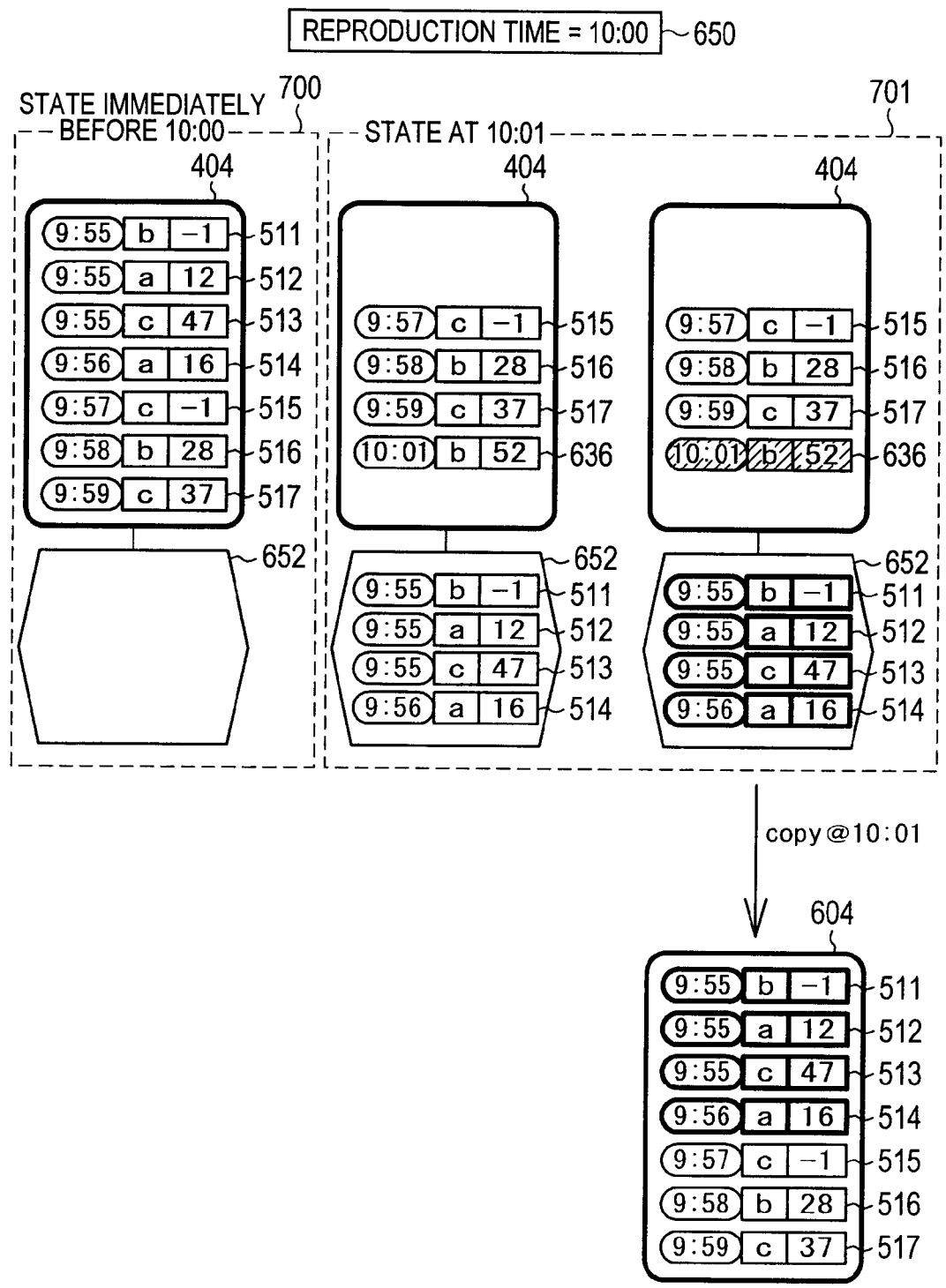
FIG. 7 is a diagram illustrating a method for reproducing an execution state of a Range window of an in-use system in the standby system according to the first embodiment.

Next, a method of reproducing the execution state in the Range window of the present embodiment will be described with reference to FIG. 7. A dashed line rectangle 700 represents the execution state of the Range window 404 immediately before 10:00. At this time point, the state change recording area 652 is empty. A dashed line rectangle 701 represents the state at 10:01. At this time, the data 511 to 514 at or before 9:56 disappear from the window operation 404 and the data 511 to 514 are recorded in the state change recording area 652. The data 636 of 10:01 is added to the window operation 404. The same execution state as that of the window operation 404 immediately before 10:00 is reproduced in the window operation 604 by copying the data on the state change recording area 652 and the data 515 to 517 except for the data 636 at or after the reproduction time 10:00 among the data 515, 516, 517, and 636 held by the window operation 404.

The method of reproducing the execution state of the Rows window is the same as that of the Range window. The method of reproducing the execution state in the Partition window of the present embodiment will be described with reference to FIG. 8.

Figure 8:
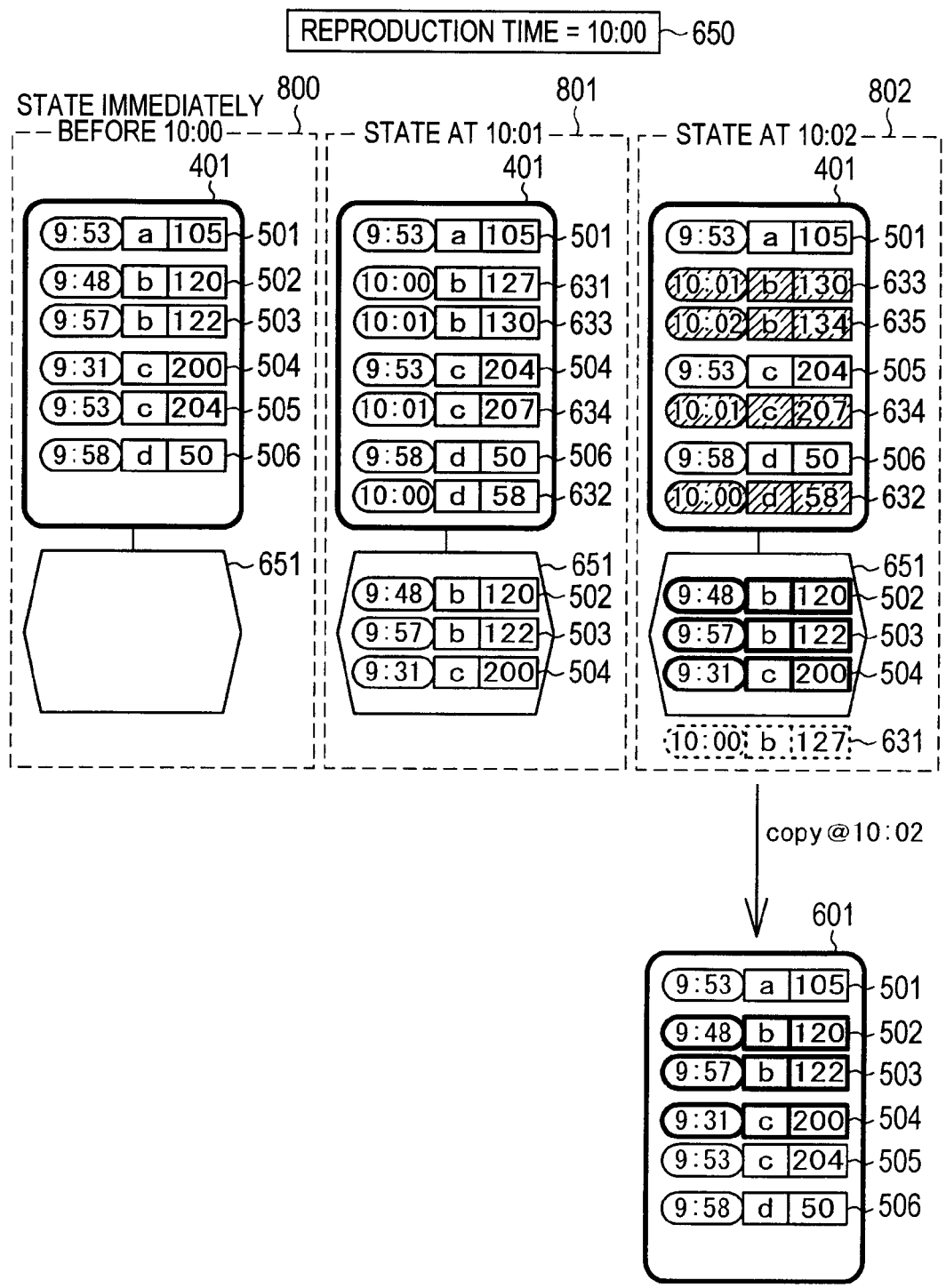
FIG. 8 is a diagram illustrating a method for reproducing an execution state of a Partition window of the in-use system in the standby system according to the first embodiment.

In FIG. 8, a dashed line rectangle 800 represents the execution state of the Partition window 401 immediately before 10:00. At this time point, the state change recording area 651 is empty. A dashed line rectangle 801 represents the state at 10:01. By this time point, two data 631 and 633 having the column id b are added to the window operation 401, so that the data 502 and 503 that have disappeared due to the upper limit of two are recorded in the state change recording area 651. Further, the data 634 having the column id c is added, so that the data 504 that has disappeared is recorded in the state change recording area 651. Further, the data 632 having the column id d is added. A dashed line rectangle 802 represents the state at 10:02. By this time, the data 635 having the column id b is added, so that the data 631 disappears. However, the data 631 is generated at or after the reproduction time 10:00, so that the data 631 is not recorded in the state change recording area.

The same execution state as that of the window operation 401 immediately before 10:00 is reproduced in the window operation 601 by copying the data on the state change recording area 651 and the data except for the data at or after the reproduction time 10:00 among the data held by the window operation 401.

Figure 9:
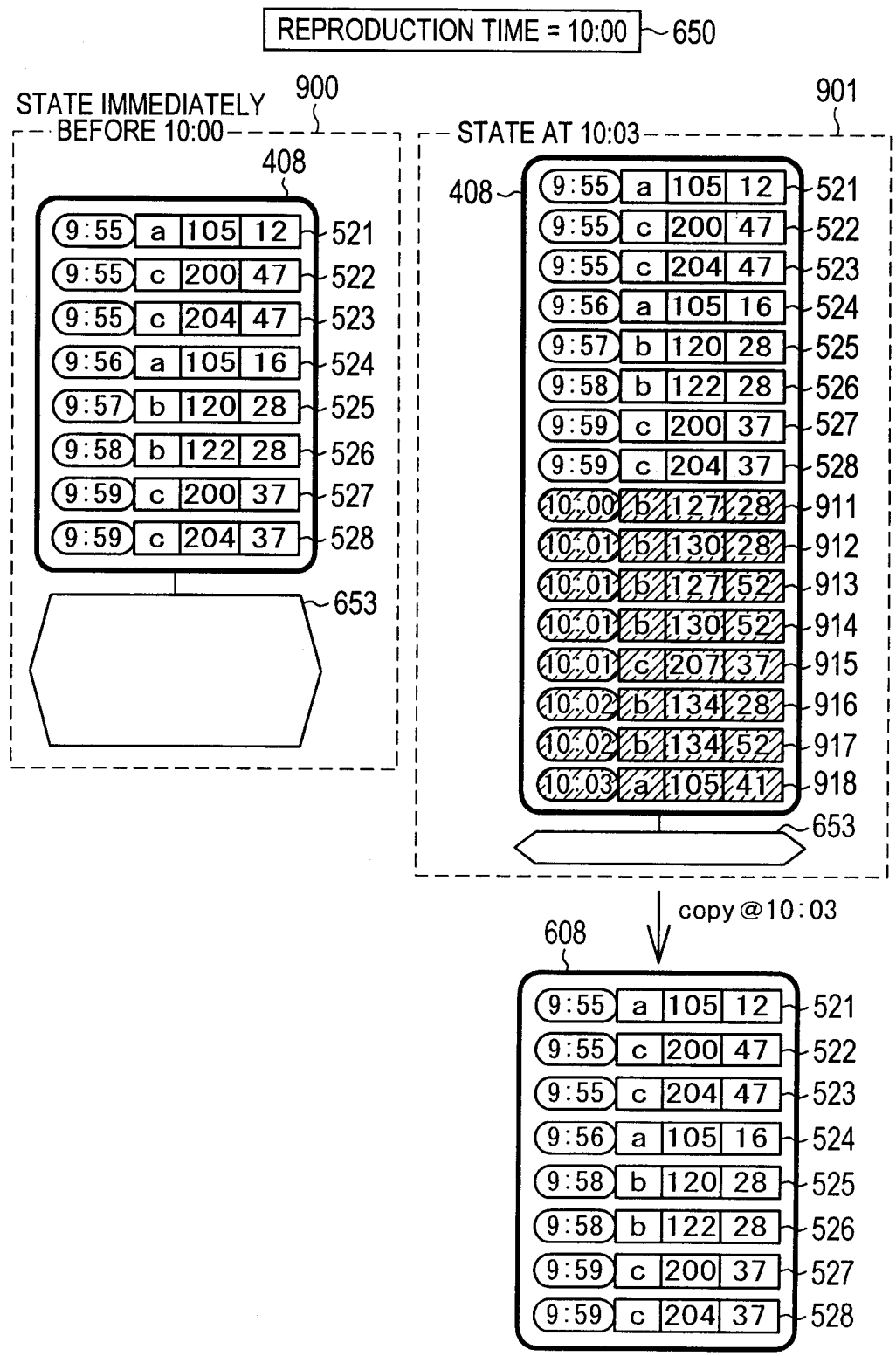
FIG. 9 is a diagram illustrating a method for reproducing an execution state of an Unbounded window of an in-use system in the standby system according to the first embodiment.

Next, a method of reproducing the execution state in the Unbounded window of the present embodiment will be described with reference to FIG. 9. A dashed line rectangle 900 represents the execution state of the Unbounded window 408 immediately before 10:00. At this time point, the state change recording area 653 is empty. A dashed line rectangle 901 represents the state at 10:03. By this time, the data 911 to 918 are added to the window operation 408. The state change recording area is still empty. In practice, the state change recording area is not necessary for the Unbounded window. The same execution state as that of the window operation 408 immediately before 10:00 is reproduced in the window operation 608 by copying the data except for the data at or after the reproduction time 10:00 among the data held by the window operation 408.

The methods of reproducing the execution state at the reproduction time for each type of the window operations of the present embodiment have been described with reference to FIGS. 7 to 9. However, if a large amount of data is held by the window operation, when the data is copied at once, the processing is stopped in the same manner as it becomes static. To avoid the above phenomenon, it is necessary to copy data of one window operation by subdividing the data into small segments.

Therefore, as a modified example of the present embodiment, a method of copying data of one window operation by subdividing the data into small segments will be described below. The method for the Unbounded window is obvious, so that the description of the method for the Unbounded window will be omitted, and the methods for the Range window and the Rows window will be described.

Figure 10:
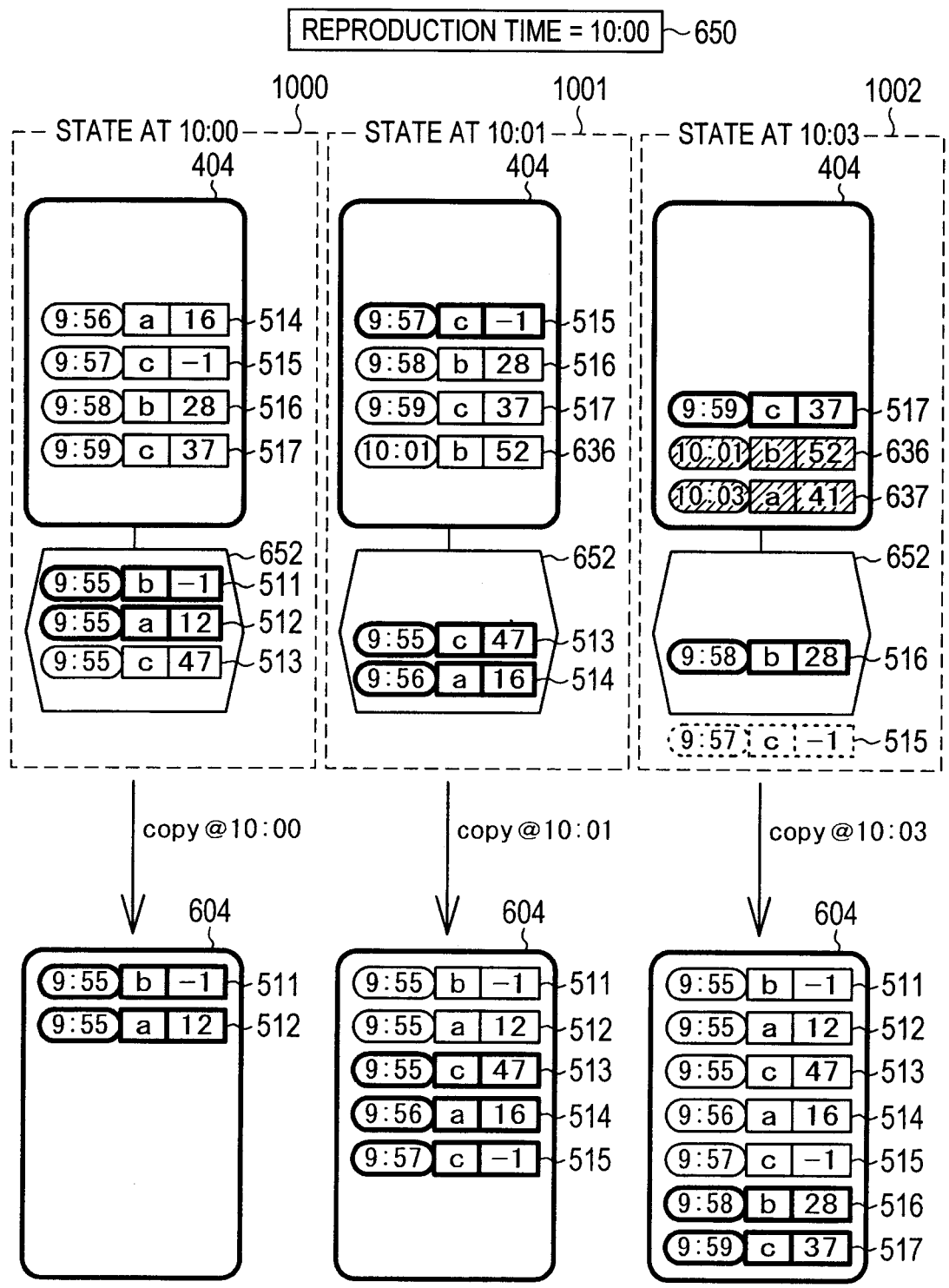
FIG. 10 is a diagram illustrating a method for subdividing and reproducing an execution state of a Range window of the in-use system in the standby system as a modified example of the first embodiment.

First, the method of reproducing the execution state of the Range window, in which copy data is subdivided into small segments, will be described with reference to FIG. 10. A dashed line rectangle 1000 represents the execution state of the Range window 404 at just 10:00. The data 511, 512, and 513 of 9:55 are recorded in the state change recording area 652. At this time point, only the two data 511 and 512 are copied to the window operation 604. Next, a dashed line rectangle 1001 represents the state at 10:01. At this time point, only the three data 513, 514, and 515 are copied to the window operation 604. When the data 513 and 514 are copied, the state change recording area 652 becomes empty, so that data on the window operation 404 is copied as the last data. Next, a dashed line rectangle 1002 represents the state at 10:03. By this time point, the data 515 of 9:57 disappears. However, the data 515 has already been copied, so that the data 515 is not recorded in the state change recording area 652. At this time point, the data 516 recorded in the state change recording area 652 and the data 517 on the window operation 404 are copied. However, the remaining data 636 and 637 are not copied because the data 636 and 637 are data at or after the reproduction time 10:00. Thus, the reproduction is completed.

The method of reproducing the execution state of the Rows window, in which copy data is subdivided into small segments, is the same as that of the Range window.

Figure 11:
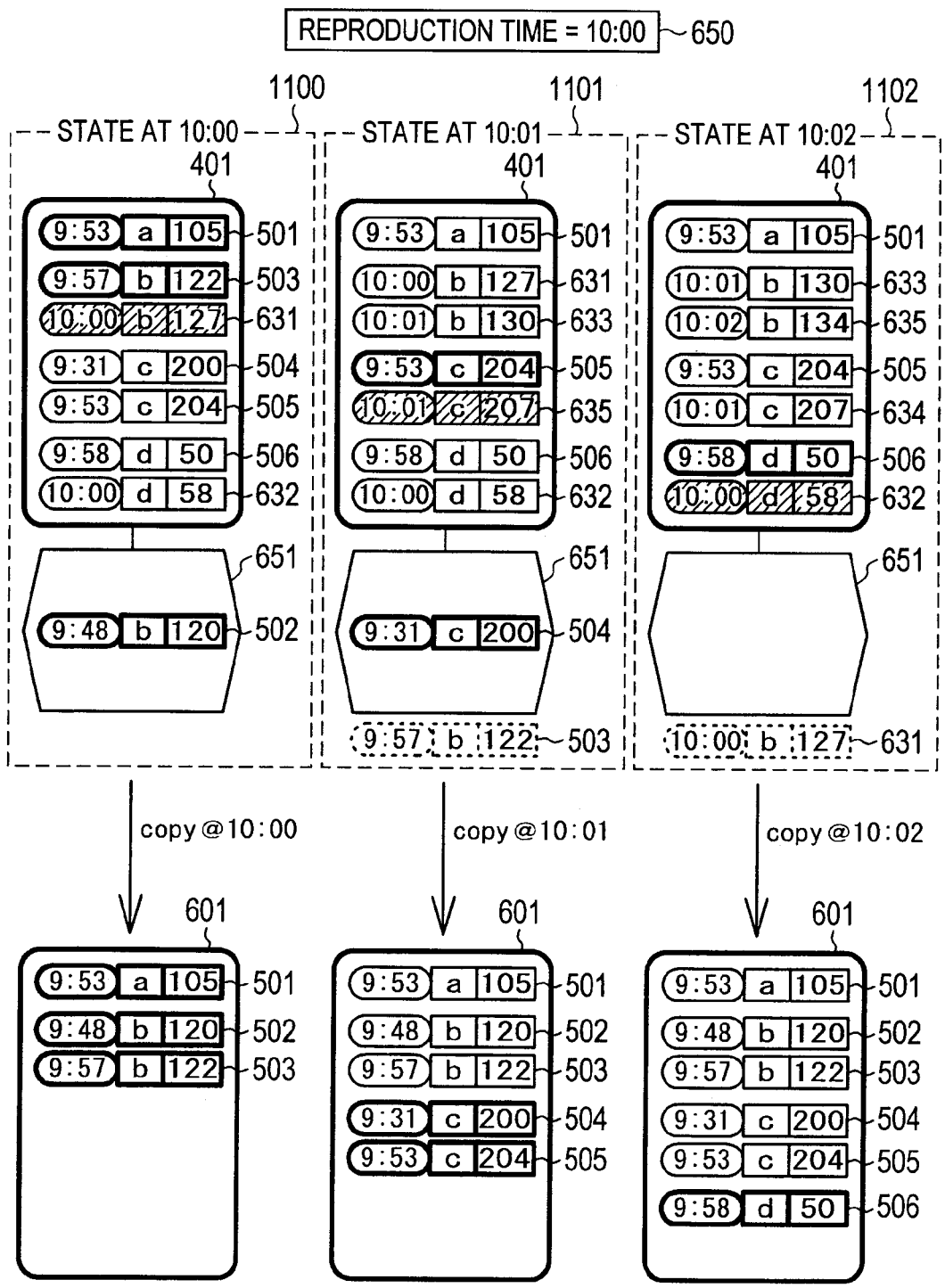
FIG. 11 is a diagram illustrating a method for subdividing and reproducing an execution state of a Partition window of the in-use system in the standby system as a modified example of the first embodiment.

Next, the method of reproducing the execution state of the Partition window, in which copy data is subdivided into small segments, will be described with reference to FIG. 11. In the Partition window, copy data are subdivided into small segments in the order of the groups and the copy is performed. In FIG. 11, a dashed line rectangle 1100 represents the execution state of the window operation 401 at just 10:00. The data 502 is recorded in the state change recording area 651. At this time point, the data 501 belonging to a group of the column id a and the data 502 and 503 belonging to a group of the column id b are copied. When the data 501 is copied, all the data in the group of the column id a is copied, so that the copy of the group of the column id a is completed. In the group of the column id b, when the data 502 in the state change recording area 651 and the data 503 of the window operation 401 are copied, the remaining data 631 is generated at or after the reproduction time 10:00, so that the copy is completed. The copied data 502 is deleted from the state change recording area 651.

A dashed line rectangle 1101 represents the execution state of the window operation 401 at 10:01. The data 504 is recorded in the state change recording area 651. By this time point, the data 503 of 9:57 disappears. However, the data 503 has already been copied, so that the data 515 is not recorded in the state change recording area 651. At this time point, in the group of the column id c, the data 504 and 505 are copied and the remaining data 634 is generated at or after the reproduction time 10:00, so that the copy is completed. A dashed line rectangle 1102 represents the execution state of the window operation 401 at 10:02. The state change recording area 651 is empty. By this time point, the data 631 of 10:00 disappears. However, the data 631 is generated at or after the reproduction time 10:00, so that the data 631 is not recorded in the state change recording area 651. At this time point, in the group of the column id d, the data 506 is copied and the remaining data 632 is generated at or after the reproduction time 10:00, so that the copy is completed.

Figure 12:
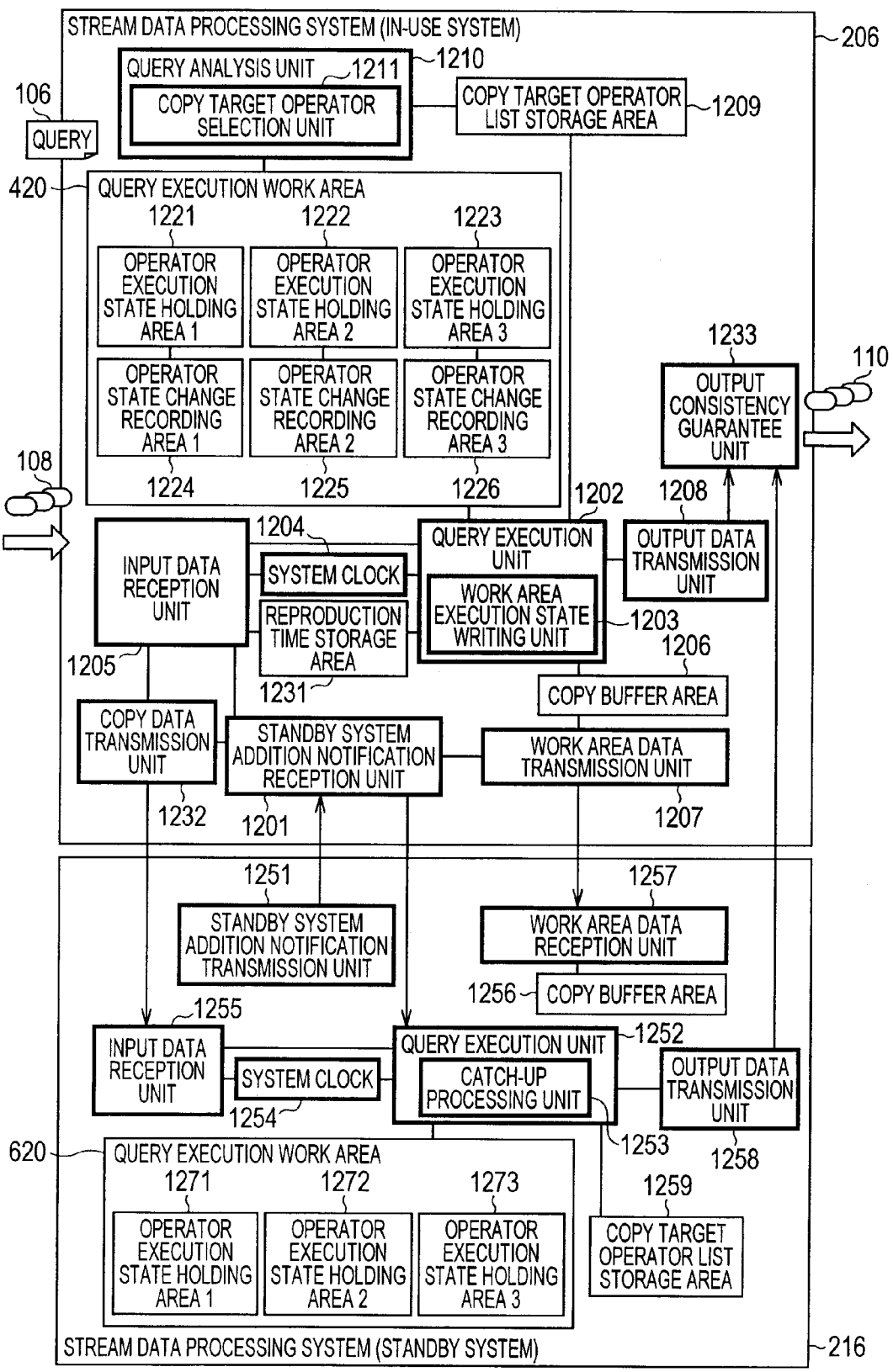
FIG. 12 is a block diagram showing a functional configuration example of a stream data processing system according to the first embodiment.

Next, FIG. 12 shows an example of a functional block diagram of software that realizes the stream data processing system of the present embodiment. The stream data processing system is divided into the in-use stream data processing system 206 and the standby stream data processing system 216. When a failure occurs in the in-use system server, the standby system server is switched to the in-use system server, so that the stream data processing systems executed by both servers are the same. However, for ease of description, both systems are described so that both systems have different structures from each other. It is obvious that the stream data processing system actually running on the computers 200 and 210 in FIG. 2 has both functions of the in-use stream data processing system 206 and the standby stream data processing system 216.

In the functional block diagram shown in FIG. 12, blocks indicated by a thick line represent software function blocks and blocks indicated by a thin line represent storage areas formed on the memory 202 and 212 included in the storage unit. For example, query execution units 1202 and 1252 indicated by a thick line represent programs executed by the CPUs 201 and 211 which are processing units of the computers 200 and 210 respectively.

On the other hand, query work areas 420 and 620, copy target operator list storage areas 1209 and 1259, copy buffer areas 1206 and 1256, and the like, which are indicated by a thin line, represent storage areas formed on the memories 202 and 212 respectively when the CPUs 201 and 211 execute a program. The query execution work area 420 and 620 form holding areas as shown in FIG. 12. Although not mentioned, also in other drawings such as FIG. 13, the blocks of thick line and the blocks of thin line indicate functional programs and storage areas on memories respectively.

In FIG. 12, the stream data processing system 206 and 216 respectively include input data reception units 1205 and 1255 that receive input data, query execution work areas 420 and 620 that hold execution states of the query graph and operators, query execution units 1202 and 1252 that execute query on the basis of data in the query execution work areas, system clocks 1204 and 1254 that clock query execution time, and output data transmission units 1208 and 1258 that output query execution result. Operator execution state holding areas 1221 to 1223 and 1271 to 1273 are respectively secured in the query execution work areas 420 and 620. In the query execution work area 420 of the in-use system, operator state change recording areas 1224 to 1226 are also secured corresponding to the operator execution state holding areas 1221 to 1223.

The stream data processing system 206 of the in-use system includes a query analysis unit 1210 that analyzes the query 106 and generates a query graph on the query execution work area. The query analysis unit 1210 includes a copy target operator selection unit 1211 that selects operators whose execution state is copied when the standby system is added from the operators on the query graph. The operators selected by the copy target operator selection unit 1211 are stored in the copy target operator list storage area 1209.

Further, the stream data processing system 206 includes a standby system addition notification reception unit 1201 that receives a standby system addition notification from the standby stream data processing system 216, a reproduction time storage area 1231 that stores the time indicated by the system clock 1204 when the standby system is added as the reproduction time, operator execution state holding areas 1221 to 1223 secured on the query execution work area 420, a work area execution state writing unit 1203 that reproduces the execution state at the reproduction time of the copy target operator from the data stored in the operator state change recording areas 1224 to 1226 and writes the execution state to the copy buffer area 1206, and a work area data transmission unit 1207 that transmits data on the copy buffer area 1206 to the standby stream data processing system 216.

On the other hand, the standby stream data processing system 216 includes a standby system addition notification transmission unit 1251 that transmits the standby system addition notification to the in-use stream data processing system 206, a work area data reception unit 1257 that receives data from the work area data transmission unit 1207 included in the in-use stream data processing system 206 and writes the data to a copy buffer area 1256, and a catch-up processing unit 1253 that moves the data in the copy buffer 1256 to the operator execution state holding areas 1271 to 1273 secured on the query execution work area 620 and performs processing of a partial query graph from the window operation to the streaming operation.

The standby stream data processing system 216 receives information of the query graph and information of the copy target operators held in the copy target operator list storage area 1209 from the standby system addition notification reception unit 1201 included in the in-use stream data processing system 206 as a response of the standby system addition notification. Then the standby stream data processing system 216 generates a query graph on the query execution work area 620 from the information of the query graph and stores the information of the copy target operators in the copy target operator list storage area 1259.

Further, the in-use stream data processing system 206 includes a copy data transmission unit 1232 that copies data at or after the reproduction time and transmits the data to the standby stream data processing system 216 and an output consistency guarantee unit 1233 that transmits data to an application on the basis of the output results of the in-use stream data processing system 206 and the standby stream data processing system 216 while guaranteeing data consistency even when a failure occurs. However, the copy data transmission unit 1232 and the output consistency guarantee unit 1233 may operate outside the in-use stream data processing system 206.

Figure 13:
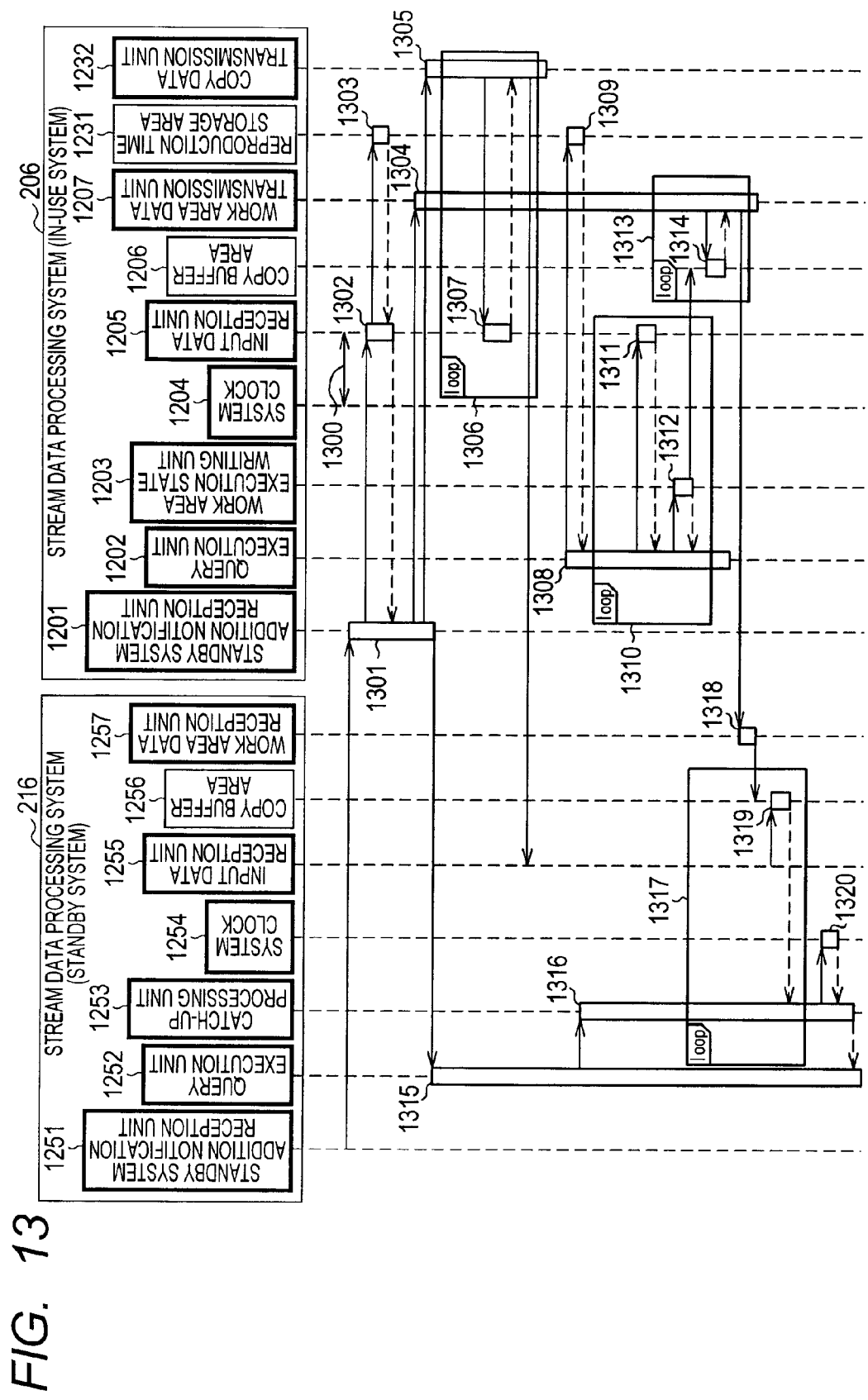
FIG. 13 is a diagram showing a processing sequence between functional blocks in a configuration example of the stream data processing system according to the first embodiment.

Next, FIG. 13 shows an execution sequence between the software blocks in FIG. 12 described above. First, reference numeral 1300 denotes a relationship between the system clock 1204 and the input data reception unit 1205. When the stream data processing system 206 adds a time stamp to the input data, the system clock 1204 is the clock of the computer and the input data reception unit 1205 uses the time indicated by the system clock 1204 when the input data reception unit 1205 receives the input data as the time stamp. On the other hand, if a time stamp is added to the input data and the stream data processing system 206 performs data processing on the basis of the time stamp, when the input data reception unit 1205 receives the input data, the input data reception unit 1205 sets the time stamp added to the input data to the system clock 1204. All the words related to the time that are used in the above description, such as the time stamp of data, the reproduction time, and the copy time, are based on the time of the system clock 1204.

When the standby system is added, the standby system addition notification transmission unit 1251 starts a process 1301 of the standby system addition notification reception unit 1201. The process 1301 starts a process 1302 of the input data reception unit 1205. The process 1302 starts a process 1303 that sets the time stamp of the leading data that has not yet been inputted into the query execution unit 1202 to the reproduction time storage area 1231. Also, the process 1302 starts a process for copying data following the leading data and transferring the copy data to the copy data transmission unit 1232. After the process 1302 is completed, the process 1301 starts a process 1304 of the work area data transmission unit 1207, starts a process 1305 of the copy data transmission unit 1232, and starts a process 1315 of the query execution unit 1252. The process 1305 receives the copy data by a process 1307 of the input data transmission unit 1205 and executes a loop 1306 for transmitting the copy data to the input data reception unit 1255.

The query execution unit 1202 repeats the execution of query in an infinite loop 1308. While the query execution unit 1202 executes the loop 1308, the query execution unit 1202 executes a process 1309 for checking the reproduction time storage area 1231, and if the reproduction time is set, an operation for copying the execution state to the standby system is started. In this operation, a loop 1310 is executed in which a process 1311 for receiving data from the input data reception unit 1205, a process for executing an operator that can process the received data, and a process 1312 for writing the execution state of the operator to the copy buffer area 1206 are repeatedly performed.

The process 1304 of the work area data transmission unit 1207 executes a loop 1313 in which a process 1314 for receiving data from the copy buffer area 1206 and a process 1318 for asynchronously transmitting the received data to the work area data reception unit 1257 are repeatedly performed. The process 1318 stores the received data in the copy buffer area 1256.

A process 1315 of the query execution unit 1252 in the standby system 216 starts a process 1316 of the catch-up processing unit 1253. The process 1316 executes a loop 1317 in which a process 1319 for reading data stored in the copy buffer 1256 is repeatedly performed until the execution states of all the copy target operators are received. When the process 1316 exits from the loop 1317, the process 1316 executes a process 1320 for setting the reproduction time to the system clock 1254 and returns to the process 1315 of the query execution unit 1252. Thus, the return to the duplex configuration in the system of the present embodiment is completed.

Figure 14:
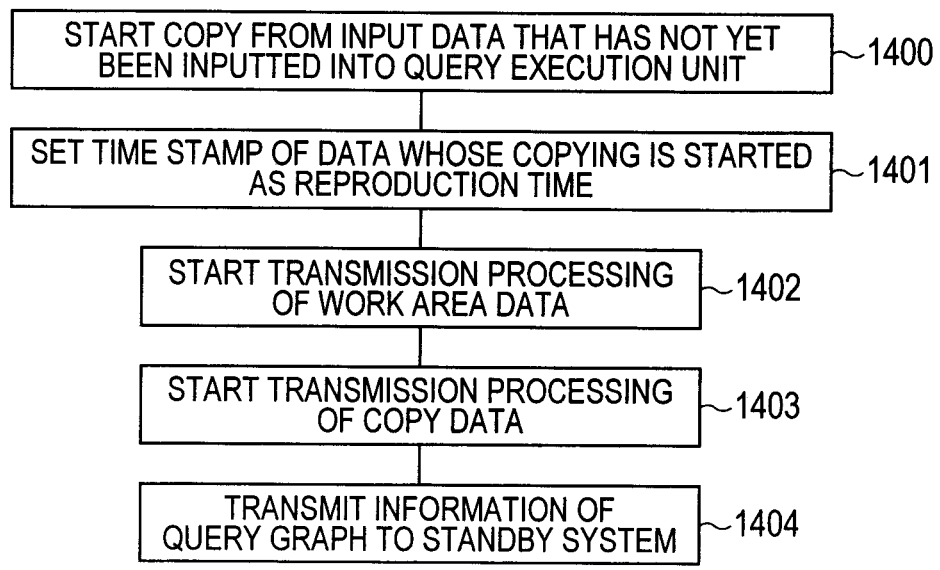
FIG. 14 is a flowchart showing an operation of the in-use system when adding a standby system according to the first embodiment.
Figure 15:
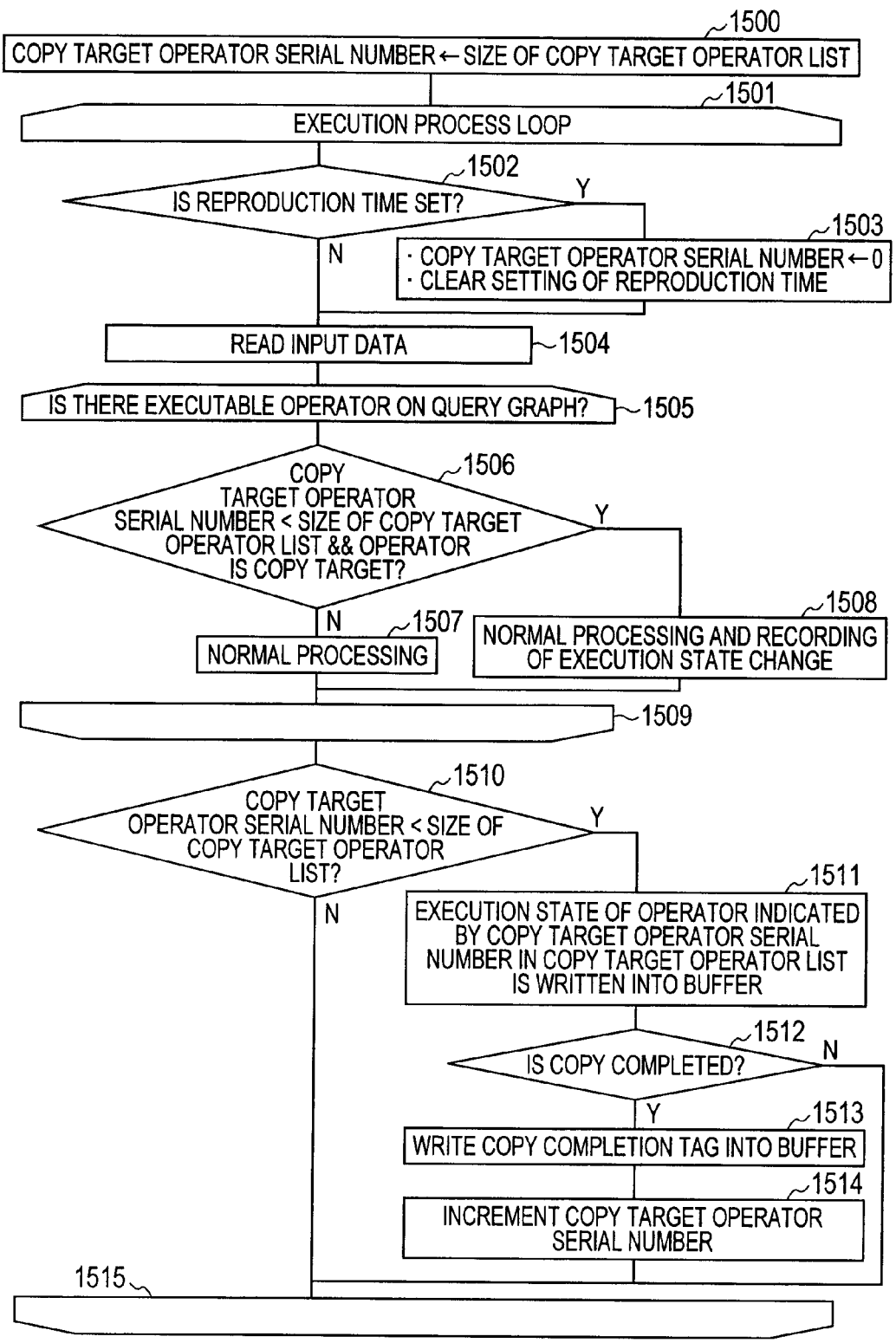
FIG. 15 is a flowchart showing an operation of a query execution loop in the in-use system according to the first embodiment.
Figure 16:
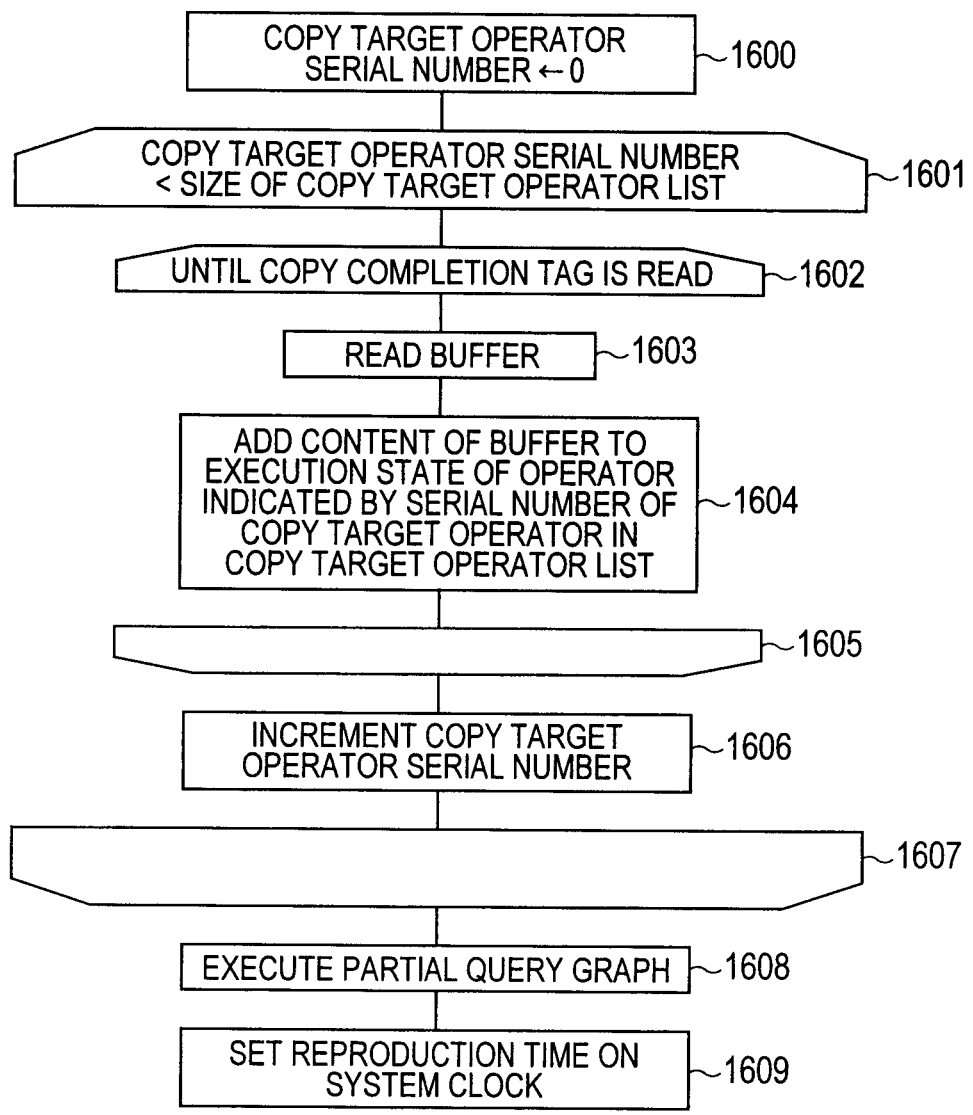
FIG. 16 is a flowchart showing an operation of a standby system when adding the standby system according to the first embodiment.

Next, FIGS. 14, 15, and 16 show an example of the process flow in the system of the present embodiment.

First, FIG. 14 is a flow of the process 1301 in the standby system addition notification reception unit 1201. The process 1400 starts copy from the top of data that has not yet been inputted into the query execution unit 1202 in the input data reception unit 1205. The process 1401 sets the time stamp of the top data whose copying is started as the reproduction time. The process 1402 starts the work area data transmission unit 1207. The process 1403 starts the copy data transmission unit 1232. The process 1404 transmits information of the query graph, information of the copy target operator, and information of the reproduction time to the standby stream data processing system 216 and starts the query execution unit 1252.

Next, FIG. 15 is the process flow of the query execution loop in the query execution unit 1202. The process 1500 initially sets the copy target operator serial number to the size of the copy target operator list. After the initialization, the loop from the process 1501 to the process 1515 is repeatedly performed as an infinite loop. The process 1502 determines whether or not the reproduction time is stored in the reproduction time storage area 1231. If the reproduction time is stored, the process 1503 sets the copy target operator serial number to 0. Thereby, copy processing of the operator execution state is performed in the subsequent processes. The process 1503 clears the setting of the reproduction time so that the reproduction time is not determined again to be stored in the process 1502.

In the process 1504, data is read from the input data reception unit 1205, and then a loop from the process 1505 to the process 1509 is executed as long as executable operators are present on the query graph. In the process 1506, if the operator execution state is determined to be being copied on the basis of the value of the copy target operator serial number and the operator is the copy target operator, the process 1508 is executed, otherwise the normal processing 1507 is executed. In the process 1508, the normal processing is executed and the change of the execution state is recorded. The details of the process 1508 will be described later with reference to FIG. 24.

After the loop from the process 1505 to the process 1509 is exited, in the process 1510, if the operator execution state is determined to be being copied on the basis of the value of the copy target operator serial number, the copy processing of the execution state, which includes the processes 1511 to 1514, is executed. The process 1511 writes the execution state of the copy target operator indicated by the copy operator serial number in the copy target operator list to the copy buffer area 1206. The details of the process 1511 will be described later with reference to FIGS. 25 and 26.

In the process 1511, if it is determined that the copy of the copy target operator is completed, a copy completion tag is written to the copy buffer area 1206 in the process 1513 and the copy target operator serial number is incremented in the process 1514, so that the copy target operator is moved to the next operator. At this time, if copying of all the copy target operators are completed, the copy serial number becomes the size of the copy target operator list, so that the copying of the operator execution state is stopped.

Next, FIG. 16 is a flow of the process 1316 in the catch-up processing unit 1253. The process 1600 is an initialization process for setting the copy target operator serial number to 0. The loop from the process 1601 to the process 1607 is executed until the processing for all the copy target operators is completed. The loop from the process 1602 to the process 1605 is performed on the copy target operator indicated by the copy operator serial number in the copy target operator list until the copy completion tag is read from the copy buffer area 1256. In the process 1603, data is read from the copy buffer area 1256 and, in the process 1604, the read data is added to the execution state holding area of the copy target operator. When the loop from the process 1602 to the process 1605 is exited, in the process 1606, the copy target operator serial number is incremented, so that the copy target operator is moved to the next operator.

When the loop from the process 1601 to the process 1607 is exited, in the process 1608, a partial query graph from the window operations to the streaming operations is executed, and in the process 1609, the reproduction time is set to the system clock 1254. Thus, the process 1316 is completed. The process 1608 may be a pipelined parallel processing method in which the processing is started when data for a window operation is prepared for each partial query without waiting for the completion of the copies of all the copy target operators and the processing is pipelined and executed in parallel.

Figure 17:
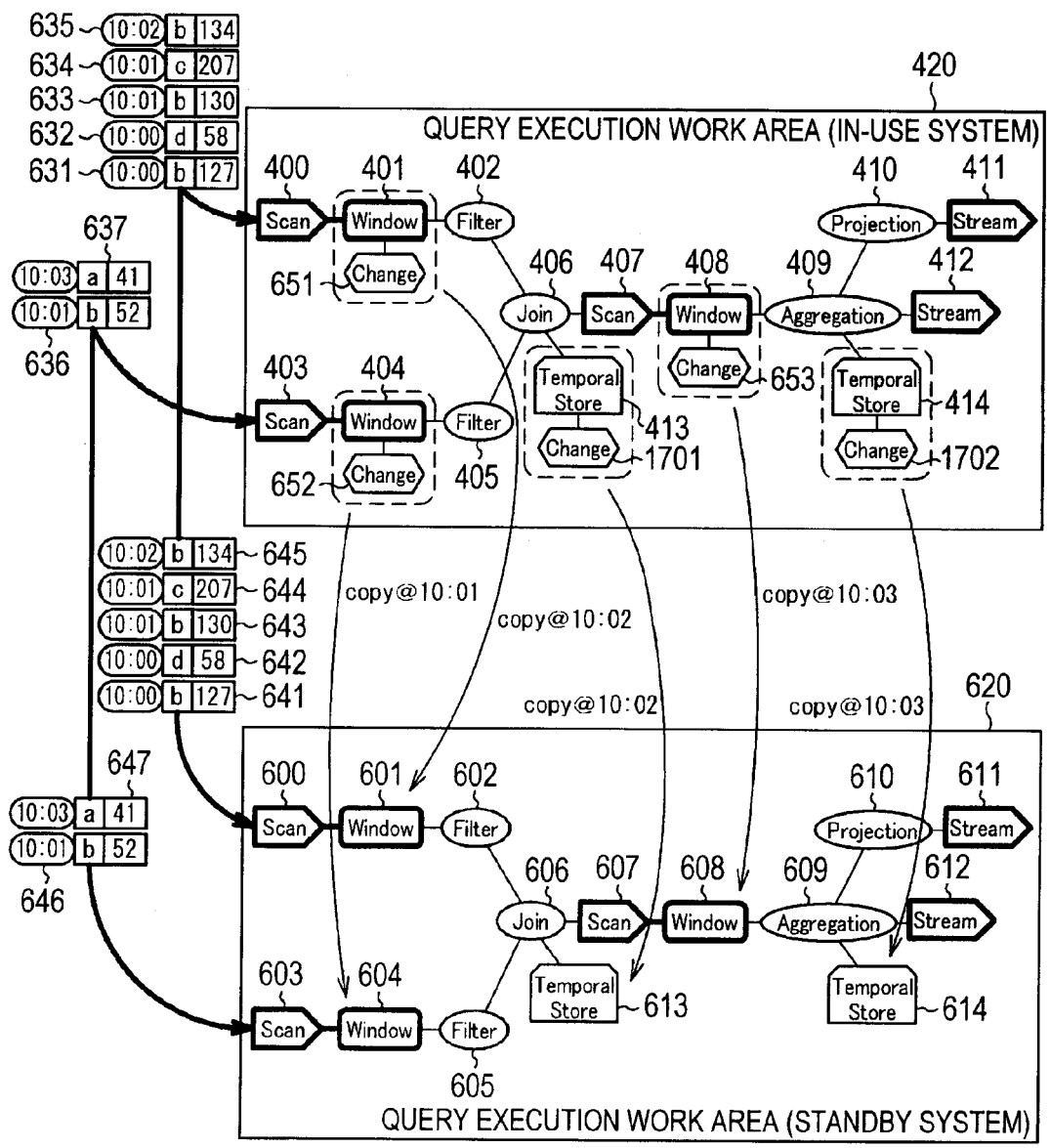
FIG. 17 is a diagram showing an outline of an operation of adding a standby system according to the first embodiment.

Next, a method of reproducing the reproduction time for operators which are other than the window operators and which hold execution state will be described with reference to FIG. 17. State change recording areas 1701 and 1702 record state changes of the temporary holding areas 413 and 414 respectively. At 10:02 when the copy is performed, the data of the temporary holding area 413 at the reproduction time 10:00 is reproduced from the temporary holding area 413 and the state change recording area 1701, and the reproduced data is copied to the temporary holding area 613. Further, at 10:03 while the copy is being performed, the data of the temporary holding area 414 at the reproduction time 10:00 is reproduced from the temporary holding area 414 and the state change recording area 1702, and the reproduced data is copied to the temporary holding area 614.

In this method, it is not necessary to execute the partial query graph in the process 1608. It is more efficient to directly copy the execution state in this way than to restore the execution state by processing the data of the window operation when the number of data processed by the join operator is largely reduced from the number of data held by the window operation by the previous-stage filter operator or the like or when the number of groups formed by aggregating the input data by the aggregation operator is largely reduced with respect to the number of the input data.

The method of reproducing the execution state of the join operator and the aggregation operator will be described below.

Figure 18:
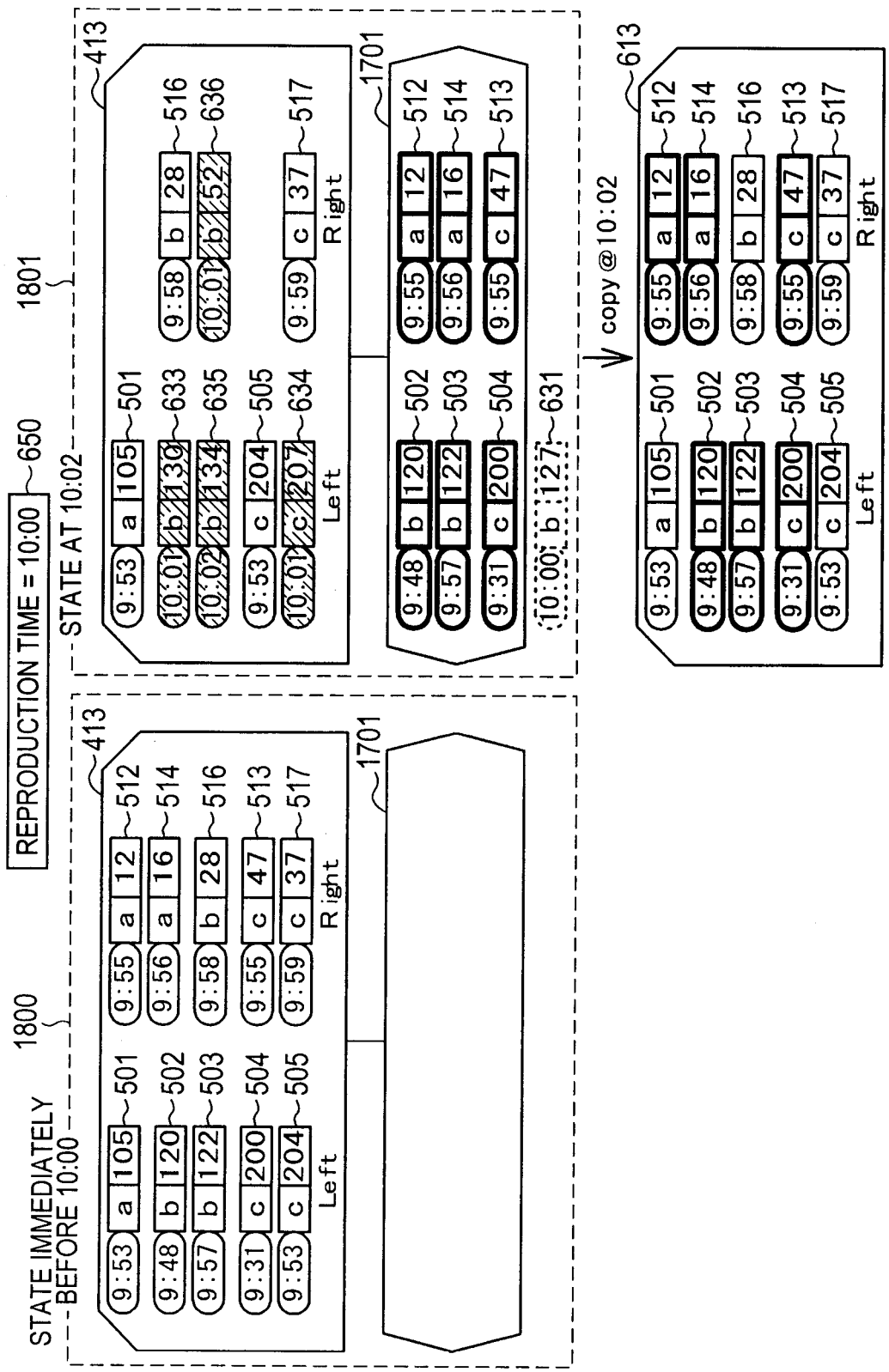
FIG. 18 is a diagram illustrating a method for reproducing an execution state of a join operator of the in-use system in the standby system according to the first embodiment.

First, the method of reproducing the execution state of the join operator will be described with reference to FIG. 18. A dashed line rectangle 1800 represents the temporary holding area 413 of the join operator 406 immediately before 10:00. At this time point, the state change recording area 1701 is empty. A dashed line rectangle 1801 represents the state at 10:02. By this time point, the data 631, 633, 634, 635, and 636 are added to the temporary holding area 413 and the data 502, 503, 504, 512, 513, 514, and 631 disappear from the temporary holding area 413. The disappearing data except for the data 631 that is generated at or after the reproduction time 10:00 are recorded in the state change recording area 1701.

The same state as that of the temporary holding area 413 immediately before 10:00 is reproduced in the temporary holding area 613 by copying the data on the state change recording area 1071 and the data except for the data at or after the reproduction time 10:00 among the data held in the temporary holding area 413.

Figure 19:
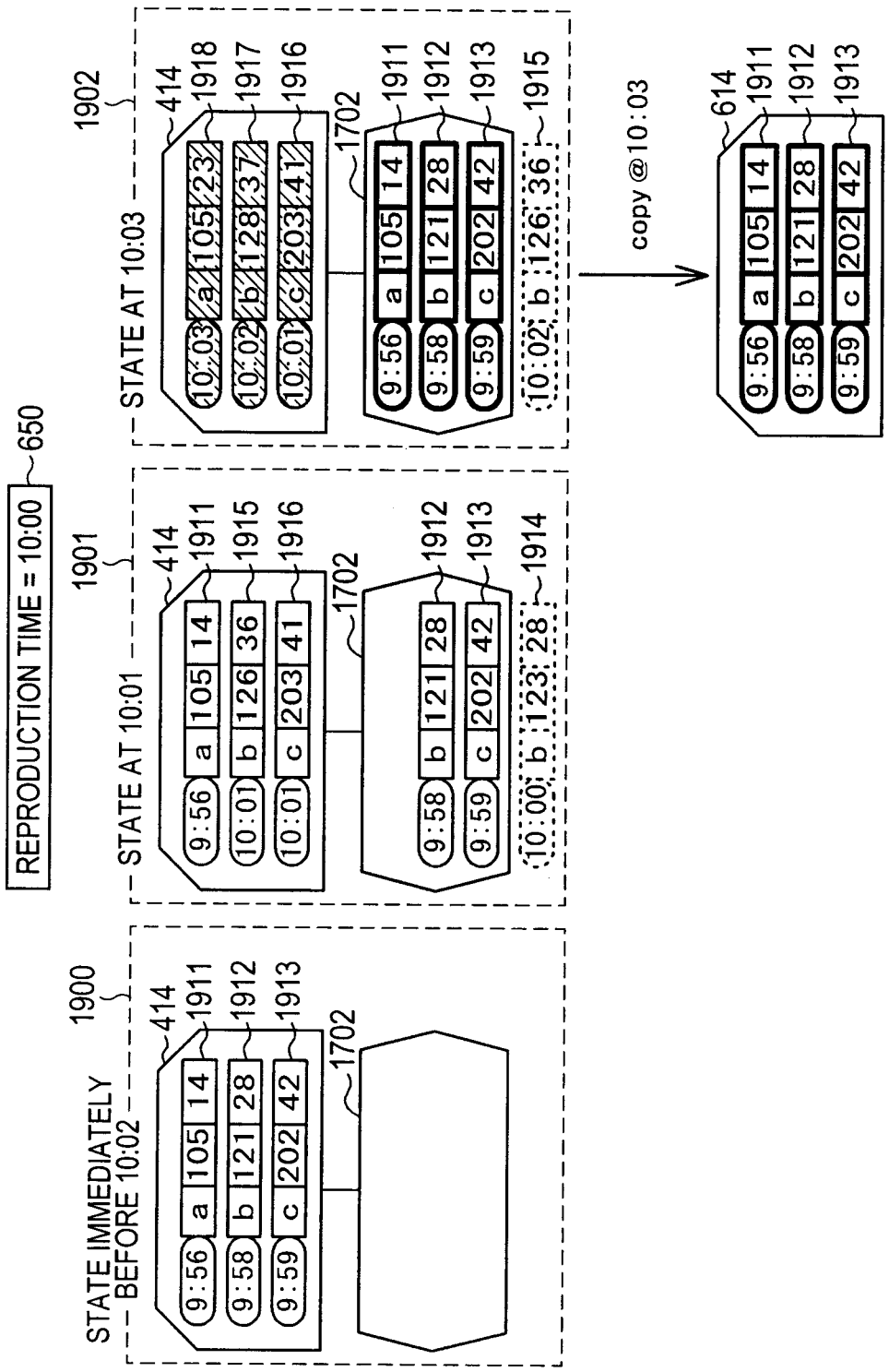
FIG. 19 is a diagram illustrating a method for reproducing an execution state of an aggregation operator of the in-use system in the standby system according to the first embodiment.

Next, the method of reproducing the execution state of the aggregation operator will be described with reference to FIG. 19. A dashed line rectangle 1900 represents the temporary holding area 414 of the aggregation operator 409 immediately before 10:00. At this time point, the state change recording area 1702 is empty. A dashed line rectangle 1901 represents the state at 10:01. By this time point, in the group of the column id b, the aggregation result is updated in the order of the data 1912, the data 1914, and the data 1915, and in the group of the column id c, the aggregation result is updated from the data 1913 to the data 1916. Here, the updated data 1912 and 1913 before the reproduction time 10:00 are recorded in the state change recording area 1702. However, the updated data 1914 at or after the reproduction time is not recorded. A dashed line rectangle 1902 represents the state at 10:02. By this time point, in the group of the column id a, the aggregation result is updated from the data 1911 to the data 1918, and in the group of the column id b, the aggregation result is updated from the data 1915 to the data 1917. Here, the updated data 1911 before the reproduction time 10:00 is recorded in the state change recording area 1702. However, the updated data 1915 at or after the reproduction time is not recorded.

The same state as that of the temporary holding area 414 immediately before 10:00 is reproduced in the temporary holding area 614 by copying the data on the state change recording area 1072 and the data (absent in this example) except for the data at or after the reproduction time 10:00 among the data held in the temporary holding area 414.

The method of reproducing the temporary holding area at the reproduction time for the join operator and the aggregation operator which are operators holding the execution state in the temporary holding area has been described with reference to FIGS. 18 and 19. However, if a large amount of data is held in the temporary holding area, when the data is copied at once, the processing is stopped in the same manner as it becomes static. To avoid the above phenomenon, it is necessary to copy data of one temporary holding area by subdividing the data into small segments. The method for performing copy by subdividing the data into small segments will be described below.

Figure 20A:
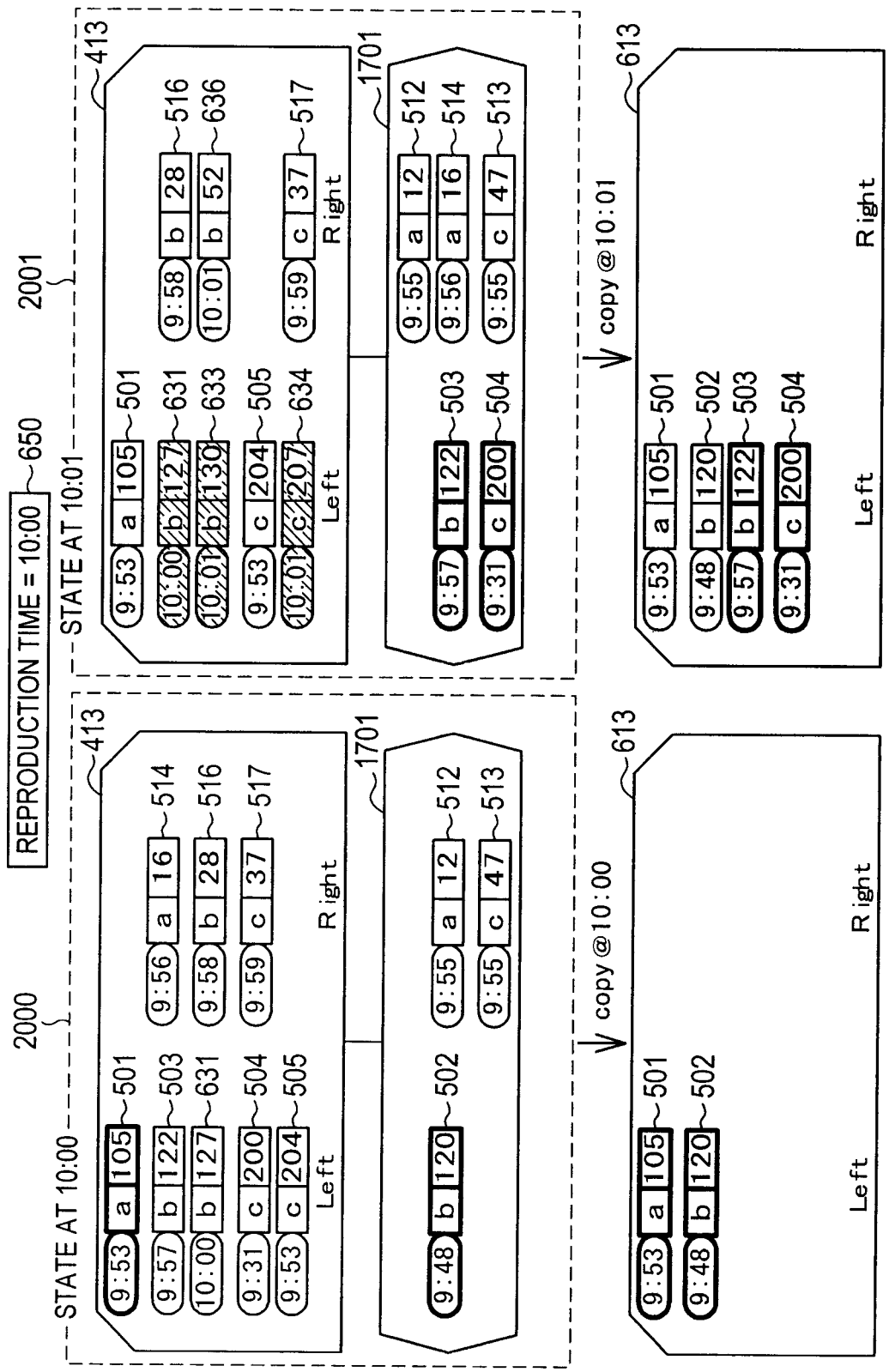
FIG. 20A is a diagram illustrating a method for subdividing and reproducing an execution state of the join operator of the in-use system in the standby system as a modified example of the first embodiment.

First, the method of reproducing a subdivided temporary holding area of the join operator will be described with reference to FIGS. 20A and 20B. In the join operator, the copy is performed by subdividing data into groups that are sorted in the order of indexes attached to the groups. In FIG. 20A, a dashed line rectangle 2000 represents the state of the temporary holding area 413 at just 10:00. The data 502, 512, and 513 are recorded in the state change recording area 1701. At this time point, only two data are copied. Here, the data 501 belonging to the group of the column id a in the left input and the data 502 belonging to the group of the column id b are copied in the order of the groups. When the data 501 is copied, all the data in the group of the column id a is copied, so that the copy of the group of the column id a is completed. In the group of the column id b, the data 502 in the state change recording area 1701 is copied and then the copy is interrupted. The data 502 is deleted from the state change recording area 1701.

In FIG. 20A, a dashed line rectangle 2001 represents the state of the temporary holding area 413 at 10:01. The data 503, 504, and 514 are added to the state change recording area 1701. At this time point, further, only two data are copied. Here, the copy is restarted from the group of the column id b in the left input, which is interrupted in the previous copy. In the group of the column id b, when the data 503 in the state change recording area 1701 is copied, the copy is completed because the data 631 and 633 in the temporary holding area 413 are data at or after the reproduction time 10:00. In the group of the column id c, the data 504 in the state change recording area 1701 is copied and then the copy is interrupted.

In FIG. 20B, a dashed line rectangle 2002 represents the state of the temporary holding area 413 at 10:02. By this time point, the data 631 disappears. However, the data 631 is generated at or after the reproduction time, so that the data 631 is not recorded in the state change recording area 1701. At this time point, further, only four data are copied. Here, the copy is restarted from the group of the column id c in the left input, which is interrupted in the previous copy. In the group of the column id c, when the data 504 in the state change recording area 1701 is copied, the copy is completed because the data 634 in the temporary holding area 413 is generated at or after the reproduction time 10:00. In the group of the column id a in the right input, when the data 512 and 514 in the state change recording area 1701 are copied, the copy is completed because there is no data in the temporary holding area 413. In the group of the column id b, there is no data in the state change recording area 1701, so that when the data 516 in the temporary holding area 413 is copied, the copy is completed because the remaining data 636 is generated at or after the reproduction time 10:00.

In FIG. 20B, a dashed line rectangle 2003 represents the state of the temporary holding area 413 at 10:03. By this time point, the data 516 disappears. However, the data 516 has already been copied, so that the data 516 is not recorded in the state change recording area 1701. At this time point, further, two data are copied. Here, the copy is restarted from the group of the column id c in the right input. In the group of the column id c, when the data 513 in the state change recording area 1701 and the data 517 in the temporary holding area 413 are copied, all the data are copied, so that the copy is completed.

Figure 21:
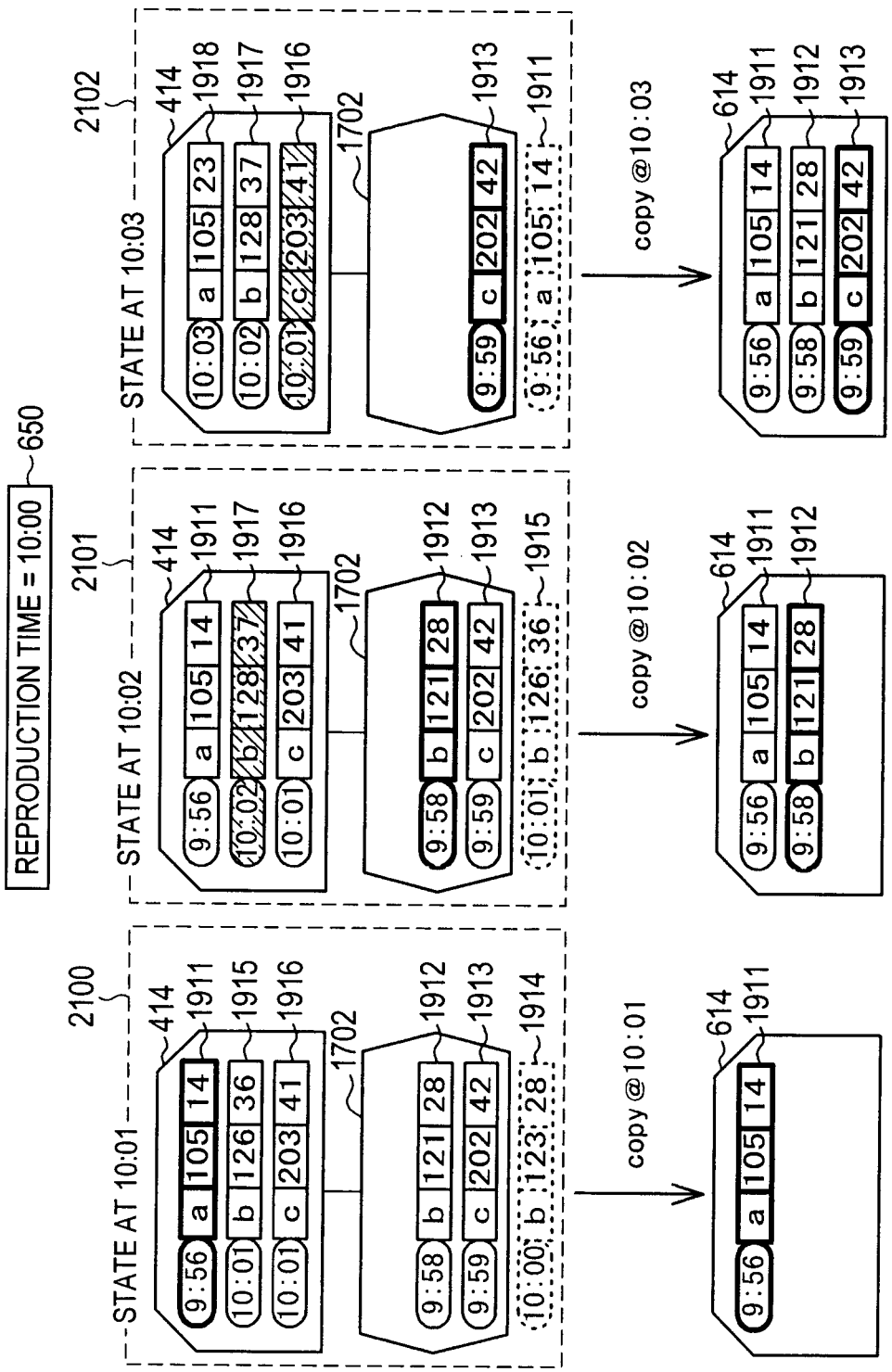
FIG. 21 is a diagram illustrating a method for subdividing and reproducing an execution state of the aggregation operator of the in-use system in the standby system as a modified example of the first embodiment.

Next, the method of reproducing a subdivided temporary holding area of the aggregation operator will be described with reference to FIG. 21. In the aggregation operator, copy data are divided into small segments in the order of the groups of aggregation unit and the copy is performed. A dashed line rectangle 2100 represents the state of the temporary holding area 414 at 10:01. By this time point, in the group of the column id b, the aggregation result is updated in the order of the data 1912, the data 1914, and the data 1915, and in the group of the column id c, the aggregation result is updated from the data 1913 to the data 1916. Here, the updated data 1912 and 1913 before the reproduction time 10:00 are recorded in the state change recording area 1702. However, the updated data 1914 at or after the reproduction time is not recorded. At this time point, the group of the column id a is copied. There is no data of the column id a in the state change recording area 1702, and when the data 1911 on the temporary holding area 414 is copied, all the data are copied, so that the copy is completed.

A dashed line rectangle 2101 represents the state of the temporary holding area 414 at 10:02. By this time point, in the group of the column id b, the aggregation result is updated from the data 1915 to the data 1917. The updated data 1915 is generated at or after the reproduction time, so that the data 1915 is not recorded in the state change recording area 1702. At this time point, in the group of the column id b, when the data 1912 in the state change recording area 1702 is copied, the copy is completed because the data 1917 on the temporary holding area 414 is generated at or after the reproduction time.

A dashed line rectangle 2102 represents the state of the temporary holding area 414 at 10:03. By this time point, in the group of the column id a, the aggregation result is updated from the data 1911 to the data 1918. The updated data 1911 has already been copied, so that the data 1911 is not recorded in the state change recording area 1702. At this time point, in the group of the column id c, when the data 1913 in the state change recording area 1702 is copied, the copy is completed because the data 1916 on the temporary holding area 414 is generated at or after the reproduction time.

Next, a method of improving efficiency of reproduction of the execution state in the Unbounded window will be described as a modified example of the present embodiment with reference to FIGS. 22 and 23.

First, a method of improving efficiency in a case in which the aggregation operator is located at the next stage of the Unbounded window will be described with reference to FIG. 22.

The aggregation operator is an operator which does not hold individual input data, but holds the aggregation result of all data. Here, the input data held in the Unbounded window never disappears, so that the aggregation result does not change unless data is added to the window. Even when data is added, existing data never disappears, so that if the aggregation operator holds only the aggregation result without holding individual data, the aggregation result after change can be calculated.

Based on the above, if an operator which holds execution state and uses the Unbounded window as an input is only the aggregation operator, the efficiency of reproduction of the execution state is improved by reproducing only the execution state of the aggregation operator and not reproducing the state of the Unbounded window.

Figure 22:
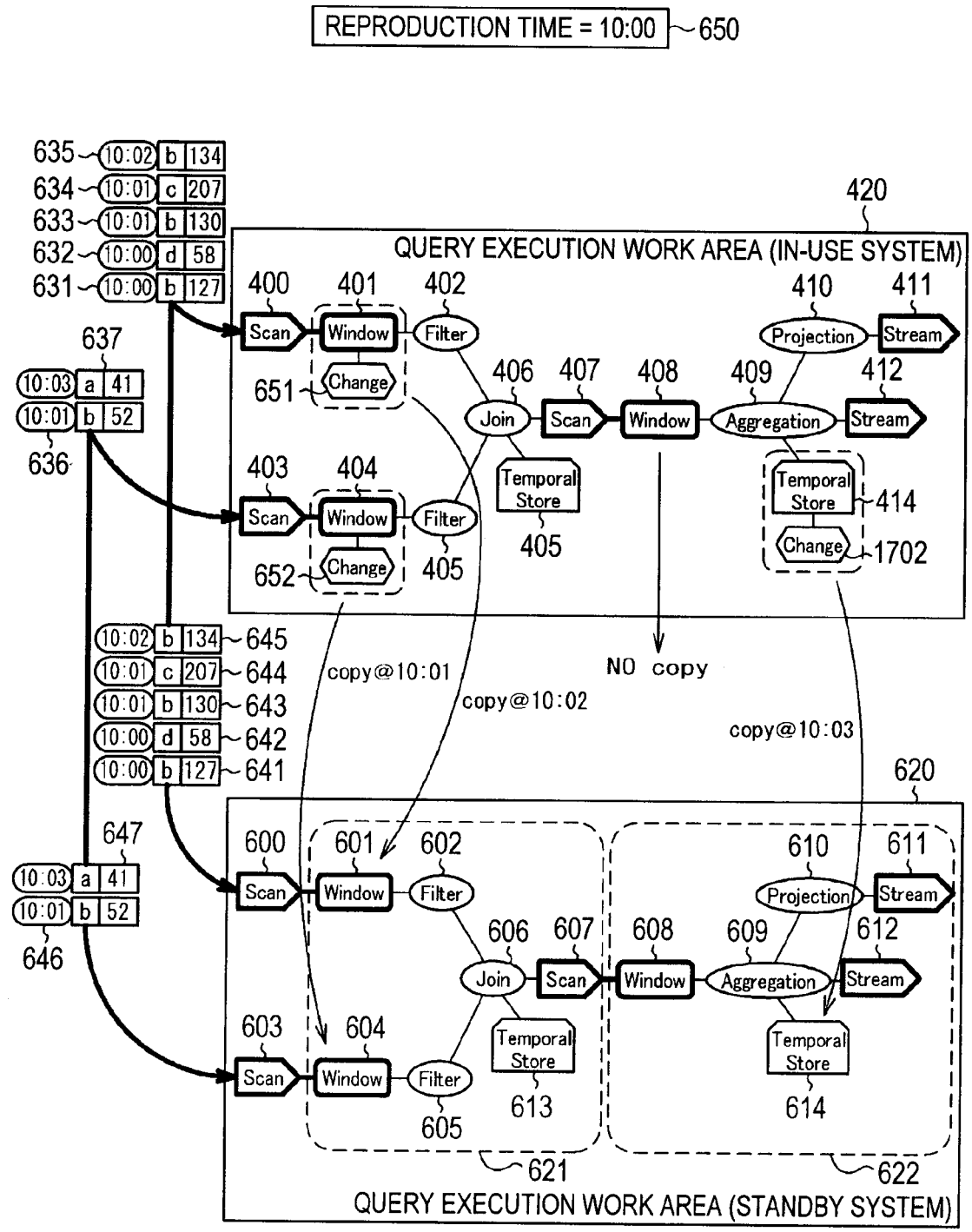
FIG. 22 is a diagram showing an outline of an operation for reproducing a state of a query including an Unbounded window when adding a standby system, which is a modified example of the first embodiment.

In the example of FIG. 22, the window operation 408 is an Unbounded window. In a partial query graph 622 which uses the Unbounded window 408 as an input, an operator which has a temporary holding area is only an aggregation operator 409. Therefore, the efficiency of reproduction of the execution state is improved by reproducing the execution state of the aggregation operator 409 and not reproducing the execution state of the Unbounded window 408.

Next, a method of improving efficiency in a case in which data held by the Unbounded window is a fixed data such as a master table will be described with reference to FIG. 23.

A master table such as a correspondence table between stock codes and stock names is considered as a fixed data aggregation which does not change. In general use, such data is loaded from a database or the like to the Unbounded window and referred to. Data that does not change is not necessary to be reproduced from the execution state of the in-use system, but the same effect can be obtained by directly downloading the data from a data base or the like that stores the original data.

Based on the above, efficiency of reproduction of the execution state of the Unbounded window holding a master table that does not change is improved by loading the master table from a database or the like and reproducing the execution state.

Figure 23:
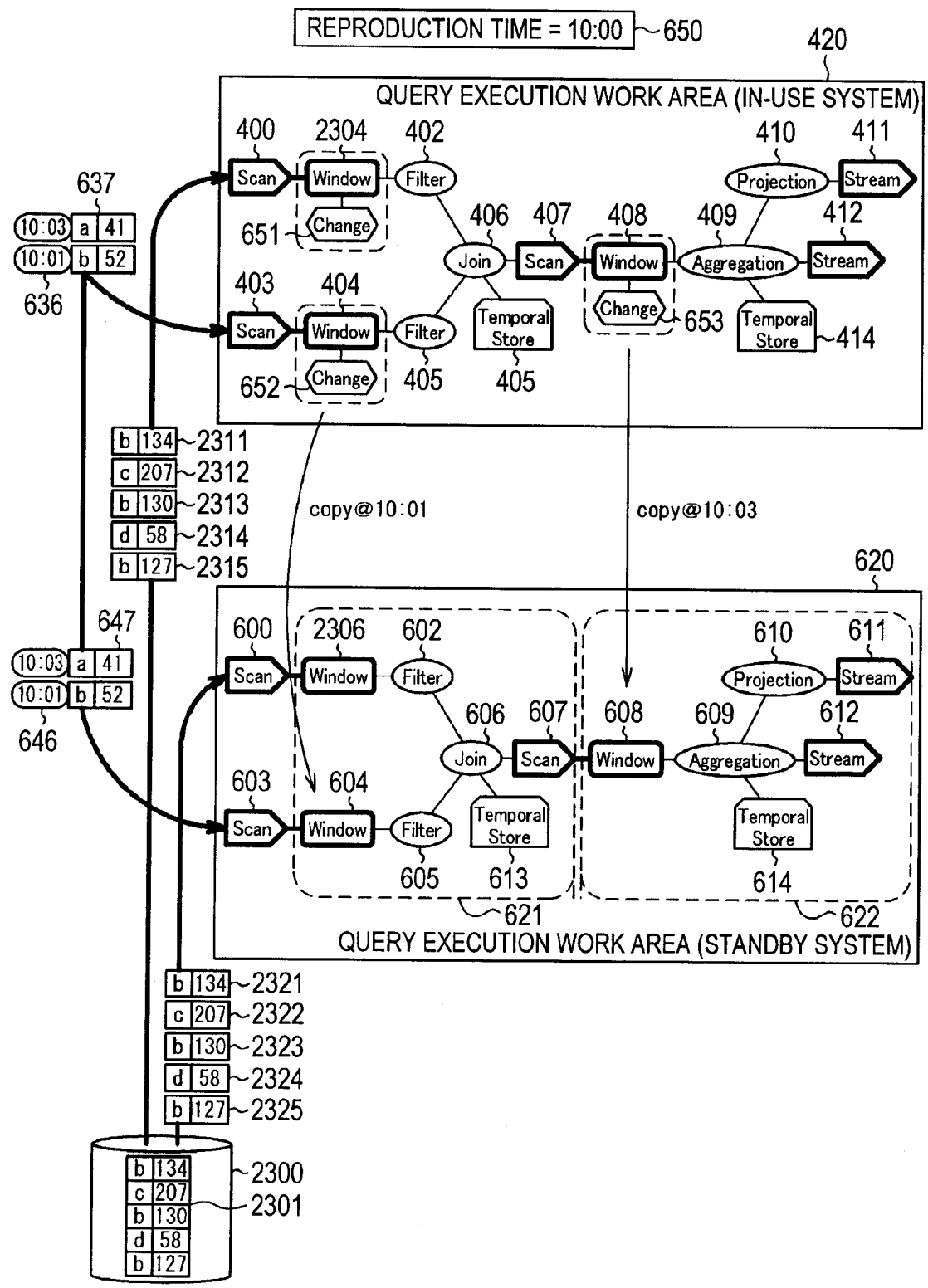
FIG. 23 is a diagram showing an outline of an operation for reproducing a state of an Unbounded window from a database when adding a standby system, which is a modified example of the first embodiment.

In the example of FIG. 23, the window operations 2304 and 2306 are Unbounded windows. A master table 2301 stored in a database 2300 is converted into data 2311 to 2315 and loaded to the Unbounded window 2304. When the standby system is added, the efficiency of reproduction of the execution state is improved by converting the master table 2301 into data 2321 to 2325 and loading the data 2321 to 2325 to the Unbounded window 2306. The time stamp of the data 2321 to 2325 may be the time before the reproduction time.

Figure 24:
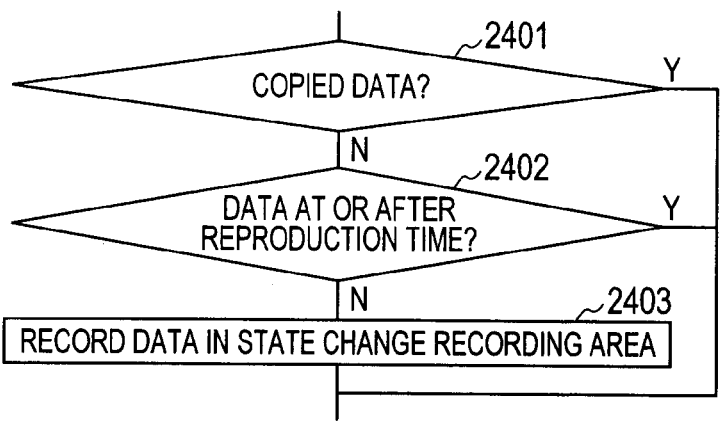
FIG. 24 is a flowchart showing a process of recording a state change during query execution shown in FIG. 15.

Next, FIG. 24 shows an example of a process flow that realizes the process 1508 in FIG. 15. FIG. 24 is a flow that determines whether or not data is recorded in the state change recording area when the data disappears from an execution state of an operator in the normal processing. In the process 2401, it is determined whether or not the data has already been copied. In the process 2402, it is determined whether or not the data is generated at or after the reproduction time. Data for which the determination result is NO in both processes 2401 and 2402 needs to be copied to the standby system, so that the data is recorded in the state change recording area.

Figure 25:
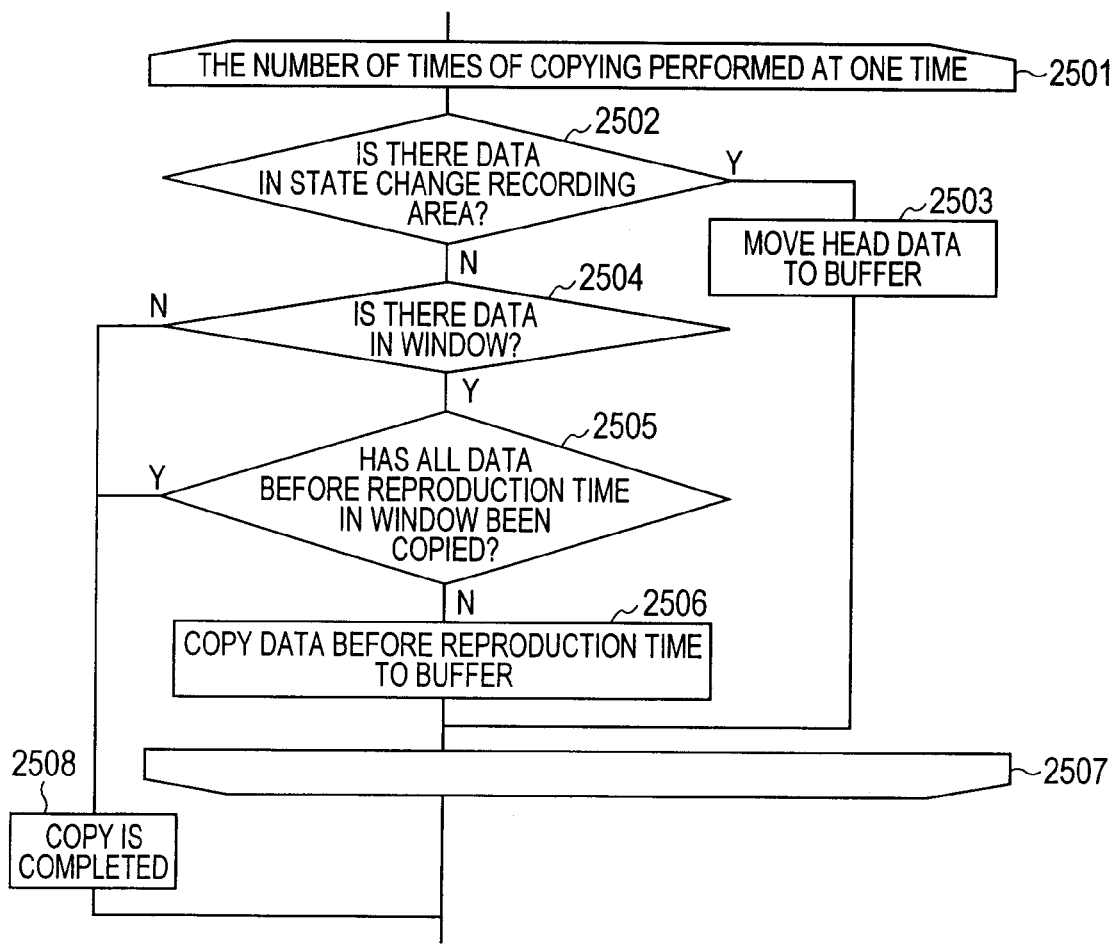
FIG. 25 is a flowchart showing a process of reproducing an execution state during query execution shown in FIG. 15.
Figure 26:
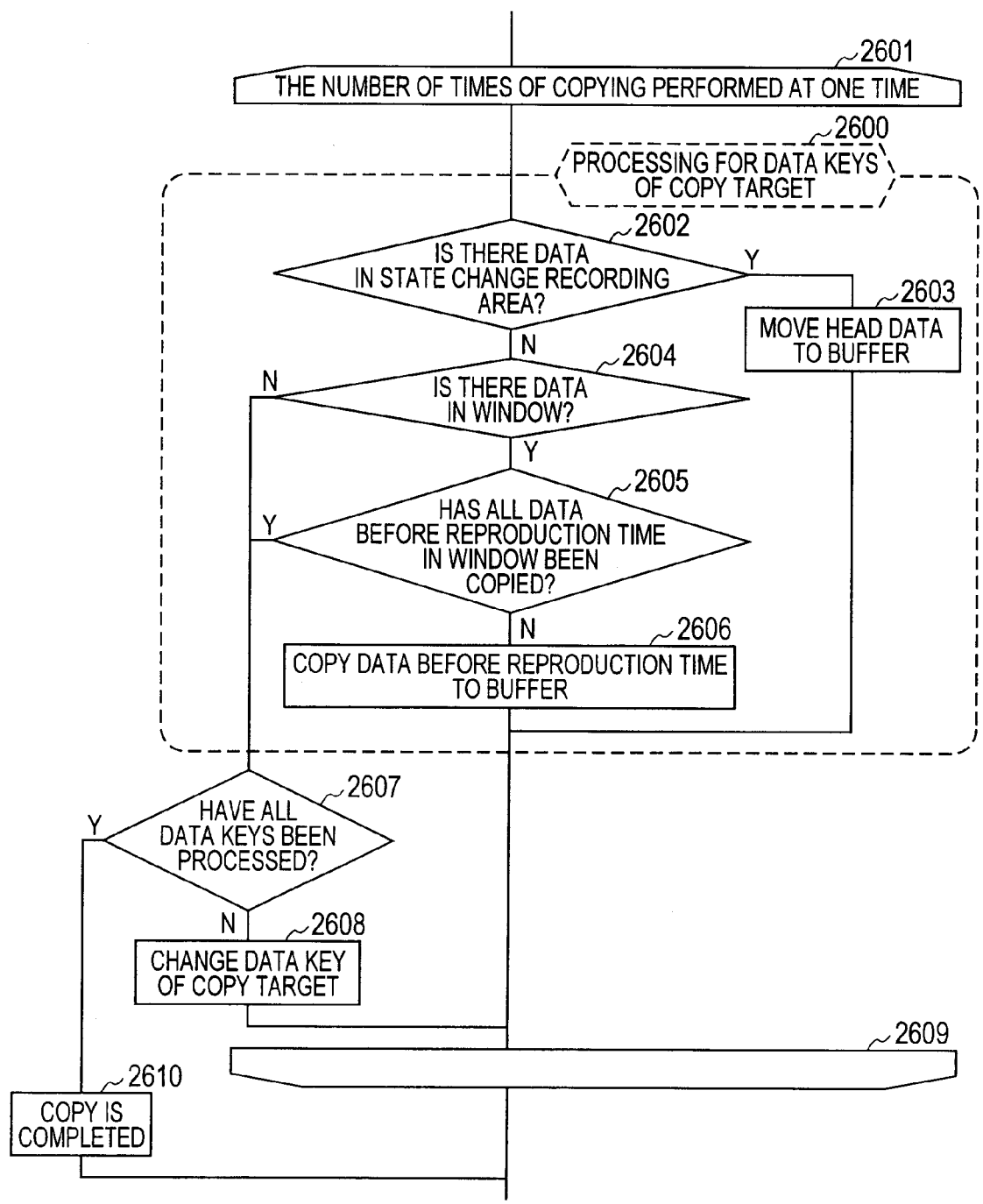
FIG. 26 is a flowchart showing a process of reproducing an execution state during query execution shown in FIG. 15.

Next, FIGS. 25 and 26 show an example of a process flow that realizes the process 1511 in FIG. 15. FIG. 25 is a flow in a Range window or a Rows window. FIG. 26 is a flow in a Partition window, a join operator, or an aggregation operator.

In a Range window or a Rows window, the loop from the process 2501 to the process 2507 in FIG. 25 is performed the number of times corresponding to the number of copies performed at one time. First, if it is determined that there is data in the state change recording area in the process 2502, the leading data of the data is moved to the buffer area 1206 in the process 2503. At this time, the leading data is deleted from the state change recording area. If the determination result is NO in the process 2502, it is determined whether or not there is data in the window in the process 2504. If the determination result is YES, it is determined whether or not all data that have a time stamp before the reproduction time have already been copied in the process 2505. If the determination result is NO, data that has not yet been copied is copied to the copy buffer area 1206. If the window is empty or all data that have a time stamp before the reproduction time have already been copied, data that needs to be copied is no more present, so that the loop from the process 2501 to the process 2507 is broken and it is determined that the copy of the operator is completed in the process 2508.

In a Partition window, a join operator, or an aggregation operator, the loop from the process 2601 to the process 2609 in FIG. 26 is performed the number of times corresponding to the number of copies performed at one time. The process 2600 enclosed by a dashed line square with rounded corners processes data keys of the copy target. For example, the initial value of the copy target data key can be set when the copy target operator is specified in the process 1503 or the process 1514 in FIG. 15.

First, if it is determined that there is data of the target data key in the state change recording area in the process 2602, the leading data of the data is moved to the buffer area 1206 in the process 2603. At this time, the leading data is deleted from the state change recording area. If the determination result is NO in the process 2602, it is determined whether or not there is data of the target data key in the window in the process 2604. If the determination result is YES, it is determined whether or not all data that have a time stamp before the reproduction time among data of the target data key have already been copied in the process 2605. If the determination result is NO, data that has not yet been copied is copied to the copy buffer area 1206. If there is no data of the target data key in the window or all data that have a time stamp before the reproduction time among data of the target data key have already been copied, data that needs to be copied is no more present, so that the process moves to the process 2607.

If it is determined that there is a data key that has not yet been processed in the process 2607, the target data key is changed in the process 2608 and the loop from the process 2601 to the process 2609 is continuously performed. If it is determined that all the data keys have been processed, the loop from the process 2601 to the process 2609 is broken and it is determined that the copy of the operator is completed in the process 2610.

For the join operator and the aggregation operator, the description of the processes 2604 and 2605, in which the word "window" is replaced by "temporary holding area", can be applied.

REFERENCE SIGNS LIST

100 Stream processing server
101, 102, 103, 200, 210 Computer
104 Network
201, 211 CPU
202, 212 Memory
203, 213 Storage device
204, 214 Network I/F
205, 215 Computer internal bus
206, 216 Stream data processing system
400 to 412, 600 to 612 Operator
413, 414, 613, 614 Temporary holding area
651, 652, 653, 1701, 1702 State change recording area
501 to 506, 511 to 517, 521 to 528, 531 to 533, 631 to 637, 641 to 647, 911 to 918, 1911 to 1918 Data
1205, 1255 Input data reception unit
1202, 1252 Query execution unit
1208, 1258 Output data transmission unit
1204, 1254 System clock
1201 Standby system addition notification reception unit
1251 Standby system addition notification transmission unit
1207 Work area data transmission unit
1257 Work area data reception unit
1203 Work area execution state writing unit
1253 Catch-up processing unit

The invention claimed is:

1. A stream data processing failure recovery method in a redundant configuration using a computer group, wherein
the computer group includes a first computer that outputs a processing result of an operator group on a query graph of data,
the first computer defines a time based on a standby system addition notification indicating that a second computer is added to the computer group, as a reproduction time,
in an execution loop of the operator group on the query graph, when executing a target operator whose state is configured be copied in the operator group, if an execution state of the target operator changes from a state at the reproduction time, the first computer stores information representing the change of the state, and
at a predetermined timing in the execution loop, the first computer reproduces an execution state of the target operator at the reproduction time from an execution state of the target operator at the timing and the information representing the change of the state and transmits the reproduced execution state to the second computer.

2. The stream data processing failure recovery method according to claim 1, wherein
the execution state of the target operator is represented by an aggregation of the data in a lifetime which should be processed by the target operator, and
a data aggregation, which is a union of
an aggregation of data which is generated before the reproduction time and which disappears from the aggregation of the data representing the execution state during a period from the reproduction time to the timing and which is the information representing the change of the state and
the aggregation of data which is generated before the reproduction time in an aggregation of data representing the execution state of the target operator at the timing,
is defined as the execution state of the target operator at the reproduction time.

3. The stream data processing failure recovery method according to claim 2, wherein
the number of data transmitted from the first computer to the second computer is limited at the timing, and
an aggregation of all data representing the execution state at the reproduction time is transmitted from the first computer to the second computer by passing through the timing a plurality of times.

4. The stream data processing failure recovery method according to claim 1, wherein
the target operator whose state should be copied is an window operation,
execution states of all the window operations included in the operator group are reproduced, the execution states are transmitted to the second computer, and the second computer completely receives the execution states, and thereafter
the second computer performs processing of operators on a partial query graph which starts from the window operations and ends at nearest streaming operations located on a post-stage of the window operations on data of the window operations having been received.

5. The stream data processing failure recovery method according to claim 4, wherein
the second computer sequentially performs pipelined parallel processing of operator processes on the partial query graph which starts from the window operation and ends at the streaming operation
from a partial query graph, in which execution states of all the window operations used as an input have been received, in the partial query graph.

6. The stream data processing failure recovery method according to claim 4, wherein
the window operation is an Unbounded window, and
when the Unbounded window is an input of an aggregation operator in the partial query graph using the Unbounded window as an input,
the Unbounded window is not defined as the target operator whose state should be copied and the aggregation operator is defined as the target operator whose state should be copied.

7. The stream data processing failure recovery method according to claim 4, wherein the window operation is an Unbounded window, and
when the first computer loads data of the Unbounded window from an external storage device,
the Unbounded window is not defined as the target operator whose state should be copied and the second computer directly loads an execution state of the Unbounded window from the external storage device.

8. A computer that performs stream data processing in a redundant configuration using a computer group, the computer comprising:
an interface;
a storage; and
a processor that outputs a processing result of an operator group on a query graph of data,
wherein, when the processor reproduces an execution state of the operator group in another computer newly added to the computer group,
the processor determines a reproduction time based on a standby system addition notification indicating that the other computer is added,
in an execution loop of the operator group on the query graph, when executing a target operator whose state is configured be copied in the operator group, if an execution state of the target operator changes from a state at the reproduction time, the processor stores information representing the change of the state in the storage, and
at a predetermined timing in the execution loop, the processor reproduces an execution state of the target operator at the reproduction time from an execution state of the target operator at the timing and the stored information representing the change of the state and transmits the reproduced execution state to the other computer via the interface.

9. The computer according to claim 8, wherein
the processor represents the execution state of the target operator by an aggregation of data in a lifetime which should be processed by the target operator, and
the processor defines a data aggregation, which is a union of
an aggregation of data which is generated before the reproduction time and which disappears from the aggregation of the data representing the execution state during a period from the reproduction time to the predetermined timing and which is the information representing the change of the state and
the aggregation of data which is generated before the reproduction time in an aggregation of data representing the execution state of the target operator at the predetermined timing,
as the execution state of the target operator at the reproduction time.

10. The computer according to claim 9, wherein
the processor limits the number of data to be transmitted at the timing, and
the processor transmits an aggregation of all data representing the execution state at the reproduction time to the other computer by passing through the timing a plurality of times.

11. A computer that performs stream data processing in a redundant configuration using a computer group, the computer comprising:
an interface;
a storage; and
a processor,
wherein, the processor transmits a standby system addition notification indicating that the computer is added to the computer group to another computer including an in-use system of the computer group via the interface,
the processor receives execution states of all window operations which are target operators whose state is configured be copied via the interface, the execution states being states at a reproduction time determined by the other computer when the other computer receives the standby system addition notification, and
the processor performs processing of operators on a partial query graph which starts from the window operation and ends at a nearest streaming operation located on a post-stage of the window operation on data of the window operation having been received.

12. The computer according to claim 11, wherein
the processor sequentially performs pipelined parallel processing of operator processes on the partial query graph which starts from the window operation and ends at the streaming operation starting from a partial query graph in which execution states of all window operations used as an input have been received.

13. The computer according to claim 11, wherein
the window operation is an Unbounded window, and
when the Unbounded window is an input of an aggregation operator in the partial query graph using the Unbounded window as an input,
the processor does not define the Unbounded window as the target operator whose state should be copied and defines the aggregation operator as the target operator whose state should be copied.

14. The computer according to claim 11, wherein
the window operation is an Unbounded window, and
when data of the Unbounded window is loaded from an external storage device
the processor does not define the Unbounded window as the target operator whose state should be copied and directly loads an execution state of the Unbounded window from the external storage device.

15. The computer according to claim 11, wherein
the storage stores stream data received at or after the reproduction time, and
the processor starts processing of the stream data stored in the storage after performing processing of operators on the partial query graph.

* * * * *